US012741755B1

(12) United States Patent
Gajjar et al.

(10) Patent No.: US 12,741,755 B1
(45) Date of Patent: Sep. 22, 2026

(54) DISTRIBUTED DIRECTED ENERGY SYSTEM

(71) Applicant: iMETALX, INC., Sausalito, CA (US)

(72) Inventors: Nehal Gajjar, San Francisco, CA (US); Alexander Jacques Fleming, San Francisco, CA (US)

(73) Assignee: IMETALX, INC., Sausalito, CA (US)

(*) Notice: Subject to any disclaimer, the term of this patent is extended or adjusted under 35 U.S.C. 154(b) by 304 days.

(21) Appl. No.: 18/417,408

(22) Filed: Jan. 19, 2024

Related U.S. Application Data

(63) Continuation of application No. 18/515,077, filed on Nov. 20, 2023, now abandoned.

(60) Provisional application No. 63/426,653, filed on Nov. 18, 2022.

(51) Int. Cl.
*B64G 1/10* (2006.01)

(52) U.S. Cl.
CPC .................................. *B64G 1/1081* (2023.08)

(58) Field of Classification Search
CPC ............................ B64G 1/1081; B64G 1/1078
See application file for complete search history.

(56) References Cited

U.S. PATENT DOCUMENTS

| | | | | |
|---|---|---|---|---|
| 5,405,108 A * | 4/1995 | Marin, Jr. | ................ | B64G 1/56 102/293 |
| 11,476,075 B2 * | 10/2022 | Ohkawa | ................. | B64G 1/648 |
| 12,049,331 B2 * | 7/2024 | Fukushima | ............ | B64G 1/244 |
| 12,296,985 B2 * | 5/2025 | Nielsen-Cole | ........... | B64G 1/56 |
| 2012/0175466 A1 * | 7/2012 | Gregory | ................... | B64G 1/56 244/158.7 |
| 2012/0261514 A1 * | 10/2012 | Boone | ...................... | B64G 1/52 244/172.8 |

FOREIGN PATENT DOCUMENTS

| | | | | |
|---|---|---|---|---|
| EP | 3156335 A1 * | 4/2017 | ............... | B64G 1/32 |
| WO | WO-2021241365 A1 * | 12/2021 | ............... | B64G 3/00 |

* cited by examiner

*Primary Examiner* — Magdalena Topolski

(57) ABSTRACT

Various embodiments comprise a distributed directed energy system. The distributed directed energy system comprises a multi-agent spacecraft group. The multi-agent spacecraft group comprises one or more spacecraft that each comprise a reflector. The multi-agent spacecraft group reflects electromagnetic energy to a shared focal point co-located with a target. The target may comprise a debris object, a material extraction location, a material processing system, an energy generation system, a heating system, a weapon system, an illumination target, another spacecraft, or an asteroid.

20 Claims, 19 Drawing Sheets

500

1000

1600

DISTRIBUTED DIRECTED ENERGY SYSTEM

RELATED APPLICATIONS

This U.S. Patent Application is a continuation of U.S. patent application Ser. No. 18/515,077 titled "DISTRIBUTED DIRECTED ENERGY SYSTEM" which was filed Nov. 20, 2023 which in turn claims the benefit of and priority to U.S. Provisional Patent Application 63/426,653 titled, "DISTRIBUTED DIRECTED ENERGY SYSTEM" which was filed on Nov. 18, 2022, and which are both hereby incorporated by reference in their entirety into this U.S. Patent Application.

TECHNICAL FIELD

Various embodiments of the present technology relate to aerospace systems, and more specifically, to multi-agent spacecraft groups that form distributed directed energy systems.

BACKGROUND

Human spaceflight generates large amounts of debris in orbit around the Earth. It is estimated that there are 100 million debris objects larger than 1 mm orbiting the Earth. The debris poses hazards to satellites and crewed missions, especially in low earth orbit. Debris smaller than 10 cm is considered lethal and non-trackable. The risk posed by the debris increases over time with growth in the space industry. It is estimated that less than 1% of the debris objects that could cause mission ending damage are currently tracked. In order to accurately characterize the threat and assess the risk of orbital debris, the size, mass, shape, and velocity of the debris should be known. Given the small particle size and large number of debris, orbital debris is difficult to track. The difficulty in tracking the debris is compounded by atmospheric drag, space weather, and non-gravitational perturbations that are difficult to predict and model.

A number of conventional debris remediation systems have been proposed to counter the threat posed by orbital debris. Some debris remediation systems include structural hardening of space assets to shield the assets from orbital debris. The structural hardening comprises Whipple shields or cladding. However, orbital debris travels at speeds up to 18 km/s which exceeds the durability of the traditional hardening regimes. For example, Whipple shields can stop debris up to 1 cm in size for hypervelocity impacts in the range of 3-18 km/s but are ineffective at stopping debris that exceed the size or speed ranges. This leaves a considerable amount debris that is considered lethal and non-trackable that may end a mission or destroy a high value space asset. Maneuvering satellites out of the way of impact trajectories is expensive. Thruster use reduces fuel resources and jeopardizes the remaining mission. The energy needed to deorbit a satellite into a decay orbit is significant. Satellites capable of Rendezvous Proximity Operations (RPO) procedures to intercept abandoned rocket bodies, payloads, and inoperable satellites are not economical for remediating smaller debris. Directed energy approaches such as lasers have been researched to move asteroids from colliding with Earth. A ground-based laser system powerful enough to intercept small debris in orbit is unable to meet the technical and economic requirements of debris removal unless to intercept a pending collision of a high valued asset.

Unfortunately, conventional space debris remediation systems do not effectively and efficiently protect space assets from space debris. Moreover, the debris remediation systems fail to meet the technical and economic requirements in order to be implemented for the removal of small orbital debris.

Overview

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to directed energy. Some embodiments comprise a distributed directed energy system. The distributed directed energy system comprises a multi-agent spacecraft group. The multi-agent spacecraft group comprises one or more spacecraft that each comprise at least one reflector. The multi-agent spacecraft group reflects electromagnetic energy to a shared focal point. The group may reflect electromagnetic radiation for debris remediation, military defense, planetary defense, energy generation, heating, material extraction, material processing, illumination, and communication operations.

Some embodiments comprise a method of operating a distributed directed energy system. The method comprises identifying a target. The method further comprises maneuvering a multi-agent spacecraft group comprising reflectors to co-locate a shared focal point of the reflectors with a spatial location of the target. The target location may comprise a piece of space debris, another satellite, a weapon, an asteroid, an energy generation system, a material extraction location, a material processing system, an illumination target, or a communication receiver.

Some embodiments comprise one or more non-transitory computer-readable storage media. The storage media stores program instructions to operate a distributed directed energy system that comprises a spacecraft with a reflector. When executed by a computing system, the program instructions direct the computing system to perform operations. The operations comprise directing a sensor suite to sense a target. The operations further comprise generating telemetry data describing a trajectory of the target based on the sensing. The operations further comprise driving transceiver circuitry to wirelessly transfer a notification indicating the target to a terrestrial system. The operations further comprise receiving, via the transceiver circuitry, an irradiation command from the terrestrial system. The operations further comprise generating a maneuver command to maneuver the spacecraft to co-locate a focal point of the reflector with the target in response to the irradiation command. The operations further comprise directing a propulsion system to execute the maneuver command. The reflector reflects electromagnetic energy to irradiate the target.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

TECHNICAL DESCRIPTION

Figure 1:
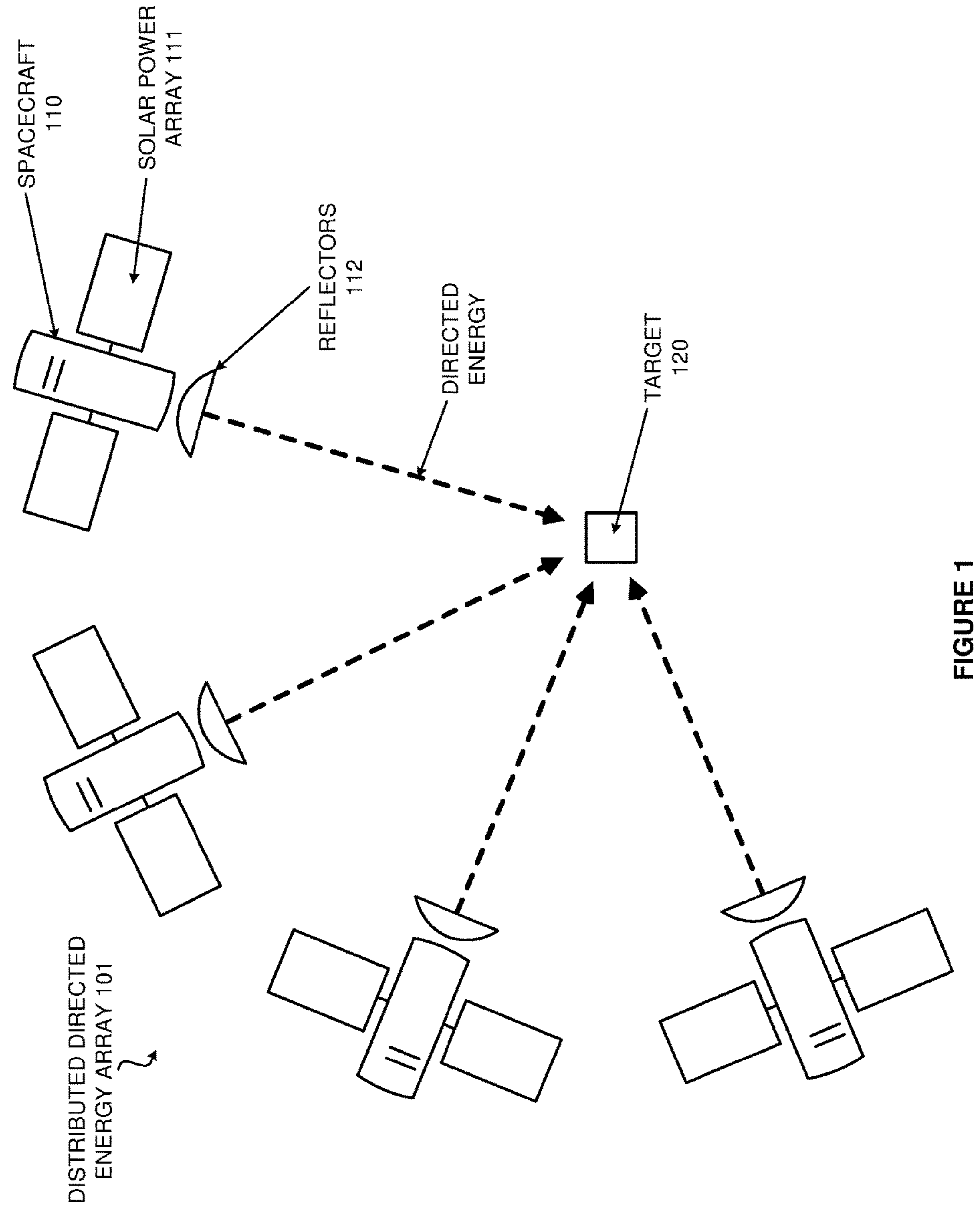
FIG. 1 illustrates an exemplary distributed directed energy array.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The examples herein present systems and methods of operating a distributed directed energy system with applications in debris removal, debris tracking, debris movement, space-based communications, power generation, materials processing, materials extraction, illumination, military defense, and planetary defense. As of 2019, there are approximately 23,000 debris objects larger than 10 cm, 500,000 debris objects in the range of 1-10 cm, and 100 million debris objects in the range of 0.1-1 cm in orbit of the Earth. The biggest threat to space assets (e.g., satellites, crewed missions, etc.) is from debris objects ranging from 1-10 cm in size. Objects larger than 1 mm possess enough destructive power to damage the shuttle/space station windows as well as giving lethal uncertainty to manned astronaut extra vehicular activities. While there are approximately 20,000 pieces of trackable space debris larger than 10 cm that need remediation, this represents less than 1% of the problem and the majority of Resident Space Objects (RSO) are lethal and un-trackable by conventional debris remediation systems. At the larger debris (>10 cm) level, current solutions are focused on developing dual use capability with In-Orbit Servicing, Assembly and Manufacturing (ISAM) capability that use robotic manipulators to capture debris satellites to provide on orbit servicing and repair as well as grapple second stage rocket bodies and disposed payloads. The technical and economic requirements of debris remediation is an important element to justify ISAM activities and debris remediation for the larger debris.

To meet the technical and economic requirements of debris remediation, a renewable energy source is considered. Autonomous Guidance, Navigation, Control (GNC) systems for small debris deflection, debris attitude control, and debris deorbiting are disclosed herein. The autonomous GNC systems comprise a dynamically coordinated multi-agent spacecraft system. The multi-agent spacecraft system provides Concentrated Solar Power (CSP) to ablate RSOs to deorbit through plume impingement or ablate into plasma entirely. Terrestrial solar furnaces concentrate solar radiation to 10 kilowatts over a 10-cm diameter (equivalent to 2,500 "suns"), achieving temperatures of 1,800° C.—and up to peak solar fluxes of 20,000 suns with specialized secondary optics to produce temperatures of up to 3,000° C. Similar to static terrestrial CSP farms, the multi-agent spacecraft groups described herein comprise spacecraft mounted heliostats that focus sunlight onto a singular point to achieve elevated temperatures (e.g., approximately 1900° C.) to perform directed energy ablation. The directed energy ablation comprises irradiating the surface of a debris object with distributed directed energy with sufficient intensity to sublimate the irradiated material. The resulting jet of gas induces a force and a torque thrusting the debris off its natural course and changing its tumbling motion causing the debris to deorbit. The multi-agent spacecraft group may reside on an equatorial orbit (or other appropriate orbit) that acts in a dynamically coordinated multi-agent fashion to focus concentrated solar power onto debris using distributed directed energy. The multi-agent spacecraft group may utilize EO/IR cameras and laser rangefinders with moving mirrors to track a target object like orbital debris, however other tracking modalities like terrestrial based observation systems may be used. This information is shared amongst the multi-agent spacecraft group and then used to change the focal point of the spacecraft heliostat locally and as a distributed satellite array. The multi-agent spacecraft group is coordinated with high-speed communication cross links (laser or RF) to dynamically concentrate solar power onto orbital debris. A digital twin of the debris will be used to determine plume impingement to first stop rotation then cause the debris to deorbit. Now referring to the Figures.

FIG. 1 illustrates view 100. View 100 illustrates an example of distributed directed energy array 101. Distributed directed energy array 101 performs distributed directed energy operations for debris removal, debris tracking, debris movement, space-based communications, power generation, materials processing, materials extraction, illumination, military defense, and planetary defense. For example, array 101 may be representative of a dynamically controlled reflector array that comprises an autonomous multi-agent spacecraft group configured for debris deorbiting operations. Array 101 comprises spacecraft 110 and target 120. Spacecrafts 110 comprise solar powered arrays 111 and reflectors 112. Spacecrafts 110 form a multi-agent spacecraft group. Target 120 is representative of a directed energy target like space debris, a material extraction location, a material processing system, an energy generation system, a heating system, a communication receiver, a weapon, another spacecraft (e.g., an adversary satellite), an asteroid, and the like. Spacecraft 110 and target 120 may reside in an orbit (e.g., around the earth) or may not have an orbit. Target 120 may reside in space, the atmosphere, or on the ground. The embodiments use the principles of physics to concentrate, reflect, and relay energy, light, and/or electromagnetic waves for various applications. The energy, light, and/or electromagnetic waves may be naturally occurring (e.g., sunlight) or manmade (e.g., a laser beam). Applications using one or many systems to concentrate, relay, reflect energy, electromagnetic waves, waveforms, laser(s), microwave beam(s), solar rays, and the like include debris remediation, communication, space domain awareness, heat/power generation, and materials extraction (e.g., lunar hydrogen extraction). Although the group of spacecrafts is illustrated comprising four individual spacecraft, the multi-agent spacecraft group may comprise any number of spacecrafts. It should be appreciated that the physical size of spacecraft 110 is not limited and that they may comprise nano-satellites, small satellites, medium satellites, large satellites, and/or any other suitable size of satellite. Moreover, the multi-agent spacecraft group may incorporate one or more static systems like terrestrial based control systems, ground-based reflectors, power generation systems, material extraction/processing systems, heat systems, and the like. In other examples, array 101 may comprise different or additional components than those illustrated in FIG. 1.

Various examples of operation and configuration of distributed directed energy systems are disclosed herein. In some examples, array 101 comprises a combination of one or more space-based sub-systems including satellites, spacecrafts, rovers, and the like. Array 101 may additionally include terrestrial sub-systems, stationary and/or movable reflectors, furnaces, thermal energy storage sub-systems, and the like. Spacecrafts 110 form an ad-hoc or pre-determined distributed array or network to achieve one or many short-term and long-term application(s) as needed. In some examples, spacecrafts 110 are arranged and coordinated to concentrate, transmit, relay, and/or receive electromagnetic waves like light, lasers, microwave beams, heat, radio waves, and the like for various applications. Spacecrafts 110 may be arranged autonomously, through ground-based orchestration, or a combination thereof. Spacecrafts 110 may execute genetic algorithms to generate trajectories for the group, given a set of restrictions that the group will abide by. For example, spacecrafts 110 may generate and share telemetry data indicating their position, velocity, trajectory, orientation, and the like and maneuver based on the shared telemetry data to avoid collisions, identify targets, position the groups focal point at the target location, and the like. Spacecrafts 110 utilize the trajectories so that each member may perform their required individual actions, while minimizing the fuel required for maneuvering and also avoiding conjunctions, to a prescribed probability of collision, for a given amount of time. For example, spacecrafts 110 may host Artificial Intelligence (AI) algorithms to determine maneuvers and optimize fuel use. In the instance that one or more of spacecrafts 110 is not functioning or is destroyed, array 101 acts as a self-healing mesh network and reorganizes itself autonomously to optimize debris tracking, ablation, and deorbiting. Spacecrafts 110 may be configured to adapt for desired payload, launch constraints, and mission.

Spacecrafts 110 comprise reflectors 112 that form an electromagnetic energy concentrator. Each reflector comprises an absorptive and/or reflective surface with curved or flat geometry that partly or fully absorbs and/or reflects energy to a focal point. The surface of reflectors may be flat or curved (e.g., in the shape of a paraboloid). Reflectors 112 may comprise a physical shape of a parabolic dish, curved surface, trough, Scheffler dish, flat surface, and/or a combination of shapes. Reflectors 112 may be constructed from flexible material and may be maneuverable. For example, reflectors 112 may close and open with varying concavity and may fold and unfold through an origami arrangement of parts. Reflectors 112 may comprise multiple surfaces and may be electronically controlled in orientation and maneuvered in any direction (linear, angular, 3-axis). The multiple surfaces may be electronically controlled like an electronic phased array or simply have its reflectivity turned on and off or varied between the two. The shape, orientation, and intensity of reflection, and/or other operating parameters of reflectors 112 may be controlled autonomously. In some examples, reflectors 112 may be constructed in orbit using 3D printing or another manufacturing technique. In some examples, reflectors 112 may comprise inflated mirrors. The concentrator formed by reflectors 112 may comprise a number of individual self-sufficient spacecraft modules to form desired shapes. Spacecrafts 110 may act like biological cells connecting with each other and adapt to perform desired configuration(s) and function(s). Spacecrafts 110 may comprise part or whole of a reflector or reflector surface.

Spacecrafts 110 comprise computing systems, sensor suites, propulsion systems, energy generation systems, and communication systems. The sensor suites comprise sensors like imaging systems, radar, rangefinders, and the like to locate target 120. The imaging systems comprise optics, detector/digitization circuitry, image processors, and transceivers. The imaging systems may image in the visible, infrared, or ultraviolet spectrum. The rangefinders comprise lasers, receivers, timers, and transceivers. The optics comprise lenses, mirrors, and the like. For example, spacecrafts 110 may comprise a tracking camera with a picture in picture capability with a static camera and a camera with a moveable mirror to track debris for space domain awareness. The sensor suites may feed forward controls into the combined solar power array formed by spacecrafts 110. Spacecrafts 110 may comprise other sensors and orientation instruments like sun sensors, star trackers, accelerometers, gyros providing PAC processing, data handling systems, storage systems, and metrology systems. Spacecrafts 110 may comprise reaction wheels, control moment gyroscopes, momentum dumping thrusters, temperature control systems to manage passive and actively controlled thermal, SSA sensors, visual and lidar sensors, and/or other set of sensors.

The propulsion systems comprise thrusters to perform various orbital changes, station keeping, trajectory modification, deorbit activities, pointing/aiming activities, and other maneuvers. The thrusters may comprise Reaction Control System (RCS). The RCS thrusters provide attitude control and translation, provide torque to allow control of spacecraft rotation (roll, pitch, and yaw). The thrusters may comprise chemical thrusters, electric thrusters, or a combination thereof. The chemical thrusters may utilize propellant tanks and pumps or pressure-fed components to produce hot gas exhaust for quick thrust, low duration maneuvers and orientations. Acceptable propellant types include bipropellant, monopropellant, and hypergolic. The electric thrusters utilize accelerated ions or ionized particles to accelerate plasmas for low thrust, long duration (high Isp) maneuvers and orientations. The electric thrusters may comprise ion thrusters (e.g., Hall thrusters, helicon RF thrusters, gridded ion thrusters, colloid thrusters, and the like), electromagnetic thrusters (e.g., plasma propulsion thrusters, magneto-plasma thrusters, and the like), and electrothermal thrusters. Other spacecraft mounted propulsion systems that may be used include solar sails, nuclear propulsion, gravity assist, gyroscopic orientation devices, reaction wheels, flywheels, and the like. Spacecrafts 110 activate their propulsion systems using maneuver commands generated autonomously based on telemetry data (e.g., velocity, position, target position) shared amongst spacecrafts 110 to maintain group shape, identify target 120, maneuver to target 120, and position the group focal point to irradiate target 120. In some examples, spacecrafts 110 may receive maneuver commands from terrestrial systems.

The energy generation systems comprise solar arrays 111, batteries, electrical connections, and the like. Solar arrays 111 comprise photovoltaic solar panels. The solar panels are constructed from photovoltaic materials like polycrystalline or monocrystalline silicon. The solar panels may comprise a flat or curved geometry. For example, the solar panels may be in the shape of a parabolic dish. The solar panels absorb electromagnetic radiation produced by the sun and convert the absorbed radiation into electricity. The solar panels transfer the electricity to the batteries which store the electricity to power the various electrical components of spacecrafts 110. Spacecrafts 110 may manage, store, condition, and distribute power. Where cooling is required in spacecrafts 110, water or other gas small channeling may be provided. One configuration is to have the cooling systems next to the transistors in order to bring the cooling as close to the necessary targeted areas including but not limited to the electronics. The communication systems comprise antennas, lasers, amplifiers, filters, modulation, analog/digital interfaces, microprocessors, software, memories, transceivers, bus circuitry, and the like. Spacecrafts 110 communicate with each other using inter-satellite communication protocols over wireless communication links. The wireless communication links comprise optical links, S-band links, Ka-band links, X-band links, and the like. Spacecrafts 110 could autonomously connect and collaborate for power, mission, data, communications, through common and standardized interfaces.

The computing systems comprise microprocessors, software, memories, transceivers, bus circuitry, and the like. The memories comprise one or more computer-readable storage media operatively coupled to the microprocessors, and store program instructions that, based on being read and executed by the microprocessors, direct the computing system to perform various functions. The functions include identifying targets (e.g., space debris or adversary satellites), coordinating the shape of the spacecraft group, maneuvering the focal point of the reflectors to a desired focus area, and the like. The computing systems of spacecrafts 110 may communicate with one another or with terrestrial based systems using the communication systems. For example, the microprocessor may process debris orbital trajectory data and report the trajectory data to the other spacecraft in the group and/or to ground station over the communication systems. The microprocessors comprise Central Processing Units (CPU), Graphical Processing Units (GPU), Digital Signal Processors (DSP), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, control applications, sensing applications, target tracking applications, maneuver applications, AI algorithms, and the like. The microprocessors retrieve the software from the memories and execute the software to drive the operation of array 101 as described herein.

Figure 2:
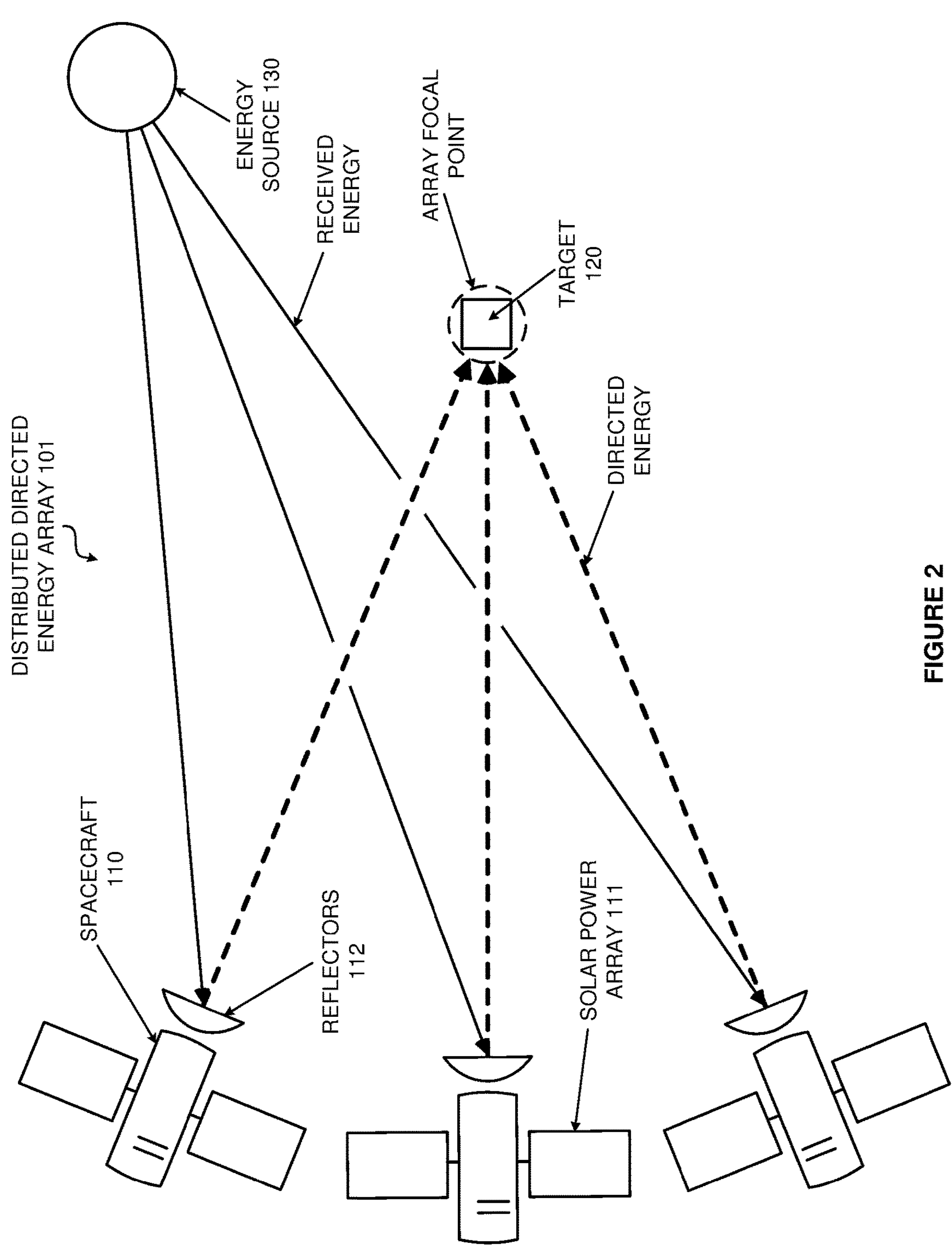
FIG. 2 further illustrates the distributed directed energy array.

FIG. 2 illustrates view 200. View 200 illustrates an example of distributed directed energy array 101. As illustrated in FIG. 2, spacecrafts 110 of array 101 are arranged to reflect energy emitted by energy source 130 to an array focal point co-located with target 120. In some examples, energy source 130 may comprise a natural energy source (e.g., the sun) or a manmade energy source (e.g., a laser). Spacecrafts 110 form a dynamically controlled array of reflectors that use rays emitted by energy source 130 to concentrate energy to the focal area of array 101. Array 101 positions its shared focal area on target 120 and reflects energy onto the target 120 heating it. For example, the reflected energy may cause a portion of target 120 to sublimate. Although illustrated as curved, reflectors 112 may comprise any geometry like flat reflectors, parabolic dish reflectors, curved reflectors, and/or another type of reflector configured to focus electromagnetic radiation from an emitter towards a space-based target object (e.g., debris). Each of spacecrafts 110 may comprise a single reflector or multiple reflectors.

In some examples, distributed directed energy array 101 may be used in debris remediation applications. In such examples, array 101 may comprise a multi-agent spacecraft group, target 120 may comprise a debris object in low-earth orbit (or some other orbit), and energy source 130 may comprise the sun. Spacecrafts 110 track the trajectory of the target 120. Spacecrafts 110 share telemetry data amongst themselves describing their trajectories and the trajectory of target 120. Spacecrafts 110 generate maneuver commands based on the shared telemetry data to position the shared focal area of reflectors 112 at a spatial location co-located with target 120. Reflectors 112 concentrate rays emitted by the sun to the target 120 causing a sublimation plume that changes the velocity of target 120. The resulting change in velocity causes target 120 to move off of its trajectory. For example, the velocity change may cause target 120 to deorbit. Debris, represented in this example as target 120, may comprise an object or subcomponent of any size, type (manmade or natural), material (density, properties, characteristics), speed, or location. The concentrated solar energy reflected by spacecrafts 110 provides impingement thrust to target 120 to move, alter the trajectory, deorbit, and/or destroy target 120. To track target 120, spacecrafts 110 may concentrate solar rays on target 120 to tag target 120 with a sublimation plume. Spacecrafts 110 may track target 120 based on the resulting plume to characterize the motion of the target 120 allowing for de-orbiting by applying impingement thrust. A digital twin of target 120 and spacecrafts 110 may be created. Various sensor modalities on different orbits and may be fused. 3D point clouds may be developed that represent targets or satellites. The deorbiting of objects or debris could be determined based on the probability and severity of conjunction. An automated system of debris remediation may be created to eliminate large swaths of debris through an autonomous array of systems.

In some examples, distributed directed energy array 101 may be used in space domain awareness applications. Array 101 may comprise a multi-agent spacecraft group comprising spacecrafts 110. Target 120 may comprise a debris object in low-earth orbit (or some other orbit) and energy source 130 may comprise the sun. Spacecrafts 110 may comprise EO/IR cameras equipped with a static camera for a wide field of view and a steerable mirror to actively track target 120. Spacecrafts 110 may comprise laser rangefinders that may be used to track the distance between target 120 and spacecrafts 110. Spacecrafts 110 may be equipped with cameras that are used stereoscopically to triangulate the position of target 120. Spacecrafts 110 may share targeting data amongst themselves and with ground stations to positively identify and determine the trajectory of target 120.

In some examples, distributed directed energy array 101 may be used in heat and power applications. In such examples, array 101 may comprise a multi-agent spacecraft group, target 120 may comprise an energy generation system, and energy source 130 may comprise the sun. For example, array 101 may perform in-orbit manufacturing on celestial bodies (lunar, asteroids, etc.) or recycling of debris into useful materials by virtue of an electro-winning of material using the CSP approach. Array 101's concentrator formed by reflectors 112 may be used to generate heat and solar power as a concentrated solar heat and power system. In terrestrial CSP applications, combined heat and power systems use a tower to heat a molten salt which usually is used to drive a steam turbine and store heat in the heated molten salt. Variations of combined heat and power system may be formulated to generate heat and power on celestial bodies such as the Moon, Mars, or other bodies for manufacturing or heat. Alternatively, array 101 may concentrate solar rays to generate power through photovoltaics for propulsion or other applications. The CSP device could be used for solar thermal propulsion to change orbits. Array 101 may concentrate solar energy to generate heat for running a reactor for material processing operations such as carbothermic reduction requiring high temperatures of mined ores and other materials on the Moon and other celestial bodies including asteroids. Similar to a combined heat and power system, the heat could be concentrated for driving reactions between raw materials, pigments, and the like to extract titanium or other materials on the Moon. For example, array 101 may be used to provide thermal energy in metallurgical applications to produce titanium metal via the Chinuka process.

In some examples, distributed directed energy array 101 may be used in material extraction applications. In such examples, array 101 may comprise a multi-agent spacecraft group, target 120 may comprise a material extraction location, and energy source 130 may comprise the sun. Array 101 may be used to extract hydrogen and other materials on celestial bodies like the Moon, especially at the lunar south pole or in lunar crevasses. For example, array 101 may focus solar energy onto a hydrogen source (e.g., lunar regolith) allowing the trapped hydrogen to outgas and then be collected. The extracted hydrogen could be used as fuel for propulsion systems, to generate power through nuclear energy, and the like. Hydrogen produced could be pressurized and stored for use in a fuel cell. Oxygen liberated by electrolysis could be used for habitable quarters. In some examples, array 101 may be used in illumination applications. For example, array 101 may focus light (e.g., on the dark side of the moon), to illuminate the lunar surface.

In some examples, distributed directed energy array 101 may be used in military defense applications. In such examples, array 101 may comprise a multi-agent spacecraft group, target 120 may comprise a weapon or adversary satellite, and energy source 130 may comprise the sun. Array 101 may be used in an Archimedes death ray configuration that tracks and uses CSP to bring down an enemy anti-Satellite (ASAT) projectile, an Intercontinental Ballistic Missile (ICBM), or an adversarial orbital asset (e.g., enemy nano satellites). In some examples, distributed directed energy array 101 may be used in planetary defense applications. In such examples, target 120 may comprise a hazardous near-earth object (e.g., an asteroid). Array 101 may concentrate radiation on the asteroid to alter the trajectory of the asteroid to prevent impact or completely ablate the asteroid into plasma.

In some examples, distributed directed energy array 101 may comprise one or more static systems in addition to the mobile spacecraft group. The static systems may comprise additional reflectors (e.g., heliostats), electromagnetic energy emitters (e.g., lasers), control systems, furnaces, power generation systems, material processing systems, and the like. Typically, the type of static systems in the group depend in part on the application of the multi-agent spacecraft group. For example, in solar power generation applications, the static systems may comprise a static solar cell. Array 101 may reflect electromagnetic energy towards the solar cell to concentrate the energy and generate electricity. For example, in debris ablation applications, the static systems may comprise a laser array. The laser array may target reflectors 112 of spacecrafts 110 and to reflect the laser light (and possibly in addition to naturally emitted electromagnetic radiation) to target 120. For example, in geological applications, the static systems may comprise a furnace. Spacecrafts 110 may position their shared focal point at the location of the furnace and reflect the electromagnetic energy to provide heat to the furnace. For example, in heat and power applications, the static systems may comprise lunar habitats. Spacecrafts 110 position their shared focal point at the location of the habitat to provide heat.

Figure 3:
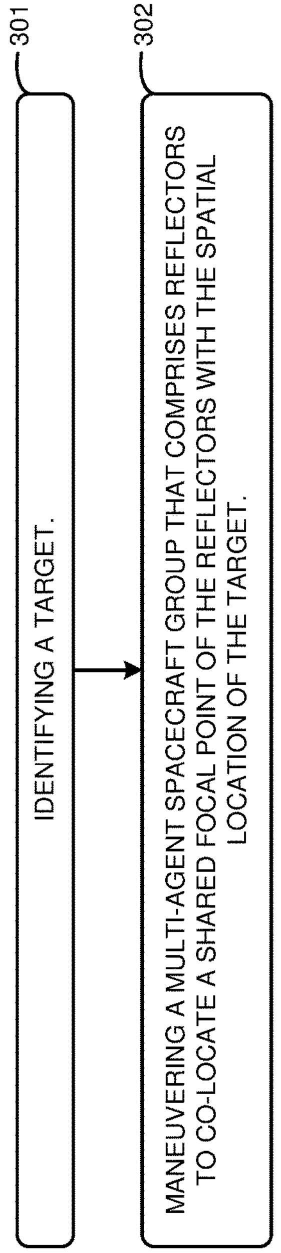
FIG. 3 illustrates an exemplary operation of the distributed directed energy array.

FIG. 3 illustrates process 300. Process 300 comprises an exemplary operation of distributed directed energy array 101 to deorbit a debris target. The operations of process 300 comprise identifying a target (step 301). The operations further comprise maneuvering a multi-agent spacecraft group that comprises reflectors to co-locate a shared focal point of the reflectors with the spatial location of the target (step 302). Referring back to FIGS. 1 and 2, views 100 and 200 include a brief example of process 300 as employed by one or more hardware systems and software applications of distributed directed energy array 101. The operation may differ in other examples.

In some examples, target 120 comprises space debris in low-earth orbit. The sensing systems of spacecrafts 110 detect target 120. The range finding systems of spacecrafts 110 determine distances between target 120 and spacecrafts 110. Spacecrafts 110 calculate a trajectory for target 120 based on the sensing, range finding, and spatial locations of spacecrafts 110. Spacecrafts 110 share the trajectory data for target 120 amongst themselves to determine the location of target 120 relative to the locations of spacecrafts 110 (step 301). Once the position of target 120 is determined, spacecrafts 110 determine maneuver commands (e.g., thruster burn times) to co-locate the focal point of array 101 with the location of target 120. For example, spacecrafts 110 may generate a digital twin of target 120 that depicts the trajectory, velocity, orientation, altitude, rate-of-rotation, or other positional characteristics for target 120. Spacecrafts 110 may then determine maneuver commands based on the digital twin of target 120 and the trajectories of each spacecraft in the group. By accounting for both the trajectory of target 120 and the trajectories of each craft in the group, spacecrafts 110 may position the shared focal point of array 101 on target 120 while avoiding collisions. Spacecrafts 110 activate their propulsion systems based on the maneuver commands (step 302). When the focal point of the array is co-located with target 120, reflectors 112 reflect sunlight towards target 120. The sunlight heats target 120 causing a portion of target 120 to sublimate. The sublimation plume alters the trajectory of target 120. The altered trajectory may move target 120 and/or cause target 120 to deorbit. Alternatively, satellites 110 may reflect sufficient radiation to sublimate target 120 entirely.

Figure 4:
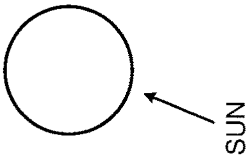
FIG. 4 illustrates an exemplary distributed directed energy array.
Figure 4:
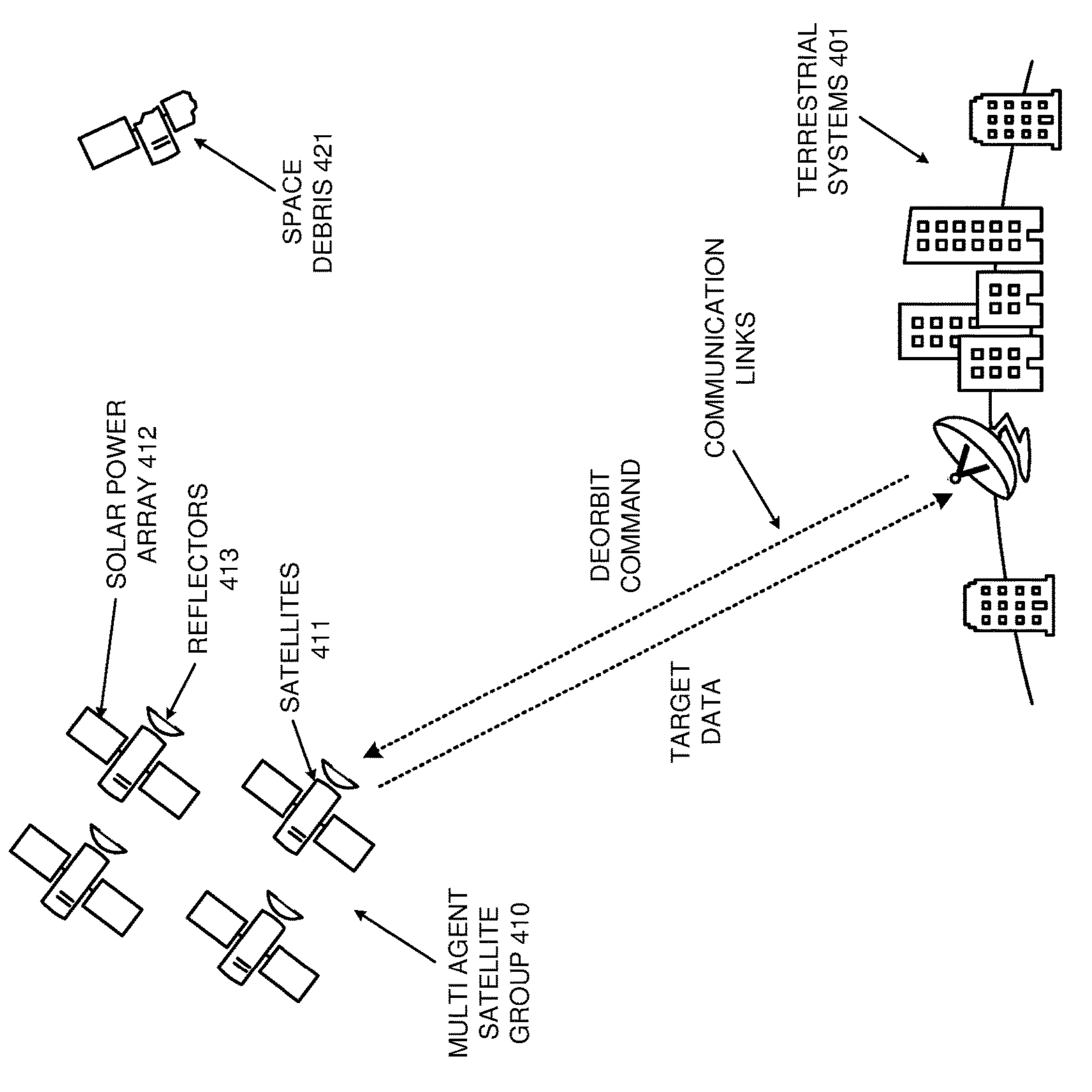

FIG. 4 illustrates view 400. View 400 illustrates an example of terrestrial systems 401, multi-agent satellite group 410, and space debris 421. Multi-agent satellite group 410 comprises satellites 411, solar power arrays 412, and reflectors 413. Terrestrial systems 401 and multi-agent satellite group 410 comprise an example of distributed directed energy array 101 illustrated in FIGS. 1 and 2, however array 101 may differ. Satellites 411 in group 410 are communicatively coupled to each other and to terrestrial systems 401 over wireless communication links. Space debris 421 is representative of an object to be deorbited. In other examples, terrestrial systems 401 and multi-agent satellite group 410 comprise different or additional components than those illustrated in FIG. 4.

In some examples, multi-agent satellite group 410 and terrestrial systems 401 form a distributed directed energy array. Multi-agent satellite group 410 comprises computing systems, communication systems (e.g., antennas), reflectors, solar panel arrays, cameras, rangefinders, propulsion systems, orientation and control systems, processing systems, and/or other spacecraft systems to maintain group shape, identify target objects, and communicate with terrestrial systems 401 and other members of the group. Satellites 410 that comprise the group arrange themselves autonomously to reflect electromagnetic radiation emitted by the sun to a shared focal point. In particular, multi-agent satellite group 410 may track the trajectory of debris 421 and maneuver to position the shared focal point on to debris 421. Satellites 411 comprise control systems to receive input tasks from ground uplinks and from each other to monitor group activity, to report irradiation results, to sense objects, and to coordinate group image sensing to generate and share composite telemetry (e.g., composite images). To generate telemetry information of target debris 421, satellites 411 may comprise sun sensors, star trackers, accelerometers, gyroscopes, data handling systems, storage systems, control moment gyroscopes, momentum dumping thrusters, SSA sensors, visual and lidar sensors, and/or other set of sensors. The sensor suite generates telemetry data indicating the velocity, orientation, altitude, position, and the like for the satellite(s) and/or debris object 421. Satellites 411 may share their telemetry data with other satellites in group 410 to autonomously adjust the shape of the group, avoid collisions, establish a shared focus point, and/or perform other operations. The telemetry data may include images of debris 421, trajectories of debris 421, trajectories for satellites 411, and the like.

Satellites 411 may relay debris telemetry data generated by the on-board sensors, imaging systems, radars, laser rangefinders, and magnetoscopes to each other and to the ground. For example, cameras and rangefinders on satellites 411 may track debris 421 and share the data amongst group 410 to determine the velocity, orientation, altitude, position, and/or other orbital characteristics of the debris 421. In some examples, satellite group 410 may transmit the telemetry data to terrestrial systems 401 to perform orbital calculations for satellites 410 and debris 421. Multi-agent satellite group 410 may receive command signaling like debris deorbiting commands from terrestrial systems 401 and/or other satellites in the group. The debris deorbiting commands may include instructions to deorbit without changing the object, to disintegrate object, size of particles to achieve, rate of deorbit to achieve, and the like. Satellites 411 may communicate with each other and with terrestrial systems 401 over optical links and/or radio frequencies in the X-band frequency range, the S-band frequency range, Ka-band frequency range, or some other frequency range or wireless communication protocol.

Satellites 411 may operate autonomously or semi-autonomously to maneuver and irradiate target objects. Satellites 411 generate maneuver commands to alter their trajectories and/or orientations. For example, satellites 411 may generate their own maneuver commands based on shared telemetry data distributed amongst the group to avoid collisions, image objects, irradiate objects, and the like. The inter-satellite communications may coordinate the group members to avoid collisions among the group and with the debris object. Satellite group 410 may utilize centralized control, local/satellite on-board control, or a combination thereof to maintain group shape, detect and monitor objects, and avoid collisions. The maneuver commands may comprise thruster activation commands, thruster deactivation commands, thrust times, dynamic aiming commands to keep target in foci/focus as deorbits/changes orientation resulting from illumination by energy, and the like. The maneuver commands indicate how to orient/move to produce the desired targeting. Satellites 411 activate their thrusters and/or other orientation control systems to position and orient themselves according to the generated maneuver commands. In some examples, satellites 411 may utilize AI, neural networks, or other types of deep learning systems to detect debris objects in image and telemetry data and generate maneuver commands to irradiate a debris object. For example, the computing systems of satellites 411 may host a Deep Neural Network (DNN) trained to control the position and generate flight plans for group 410 based on the trajectories of satellites 411 and of debris 421.

Alternatively (or in addition to), satellites 411 may receive maneuver commands from terrestrial systems 401. Similar to autonomously generated commands, the received maneuver commands may comprise thruster activation commands, thruster deactivation commands, thrust times, and dynamic aiming commands to keep target in foci/focus as deorbits/changes orientation resulting from illumination by energy, and the like. The maneuver instructions indicate how to orient/move to produce the desired targeting. Satellites 411 activate their thrusters and/or other orientation control systems to position and orient themselves according to the received maneuver commands. Upon irradiating debris 421, satellites 411 may sense the target to report the results of the irradiation. Multi-agent satellite group 410 may monitor and report the debris object before, during, and after the irradiation to determine effectiveness or completeness of the irradiation.

Terrestrial systems 401 are representative of one or more command and control systems for multi-agent satellite group 410. Terrestrial systems 401 may comprise computing systems and communication systems (e.g., antennas) to receive satellite data and/or transmit control signaling to multi-agent satellite group 410. Satellites 410 may transfer telemetry data like satellite and debris trajectories to terrestrial systems 401. Terrestrial systems 401 may approve deorbiting missions based on the received telemetry and transfer deorbiting commands to group 410. In some examples, terrestrial systems 401 may track the trajectory of satellite group 410 and debris 421 based on the received telemetry data. For example, terrestrial systems 401 may determine orbits and group shape based on the velocity, orientation, altitude, GPS data, and position of satellites 411 and debris 421. In some examples, terrestrial systems 401 may utilize AI, neural networks, or other types of deep learning systems to detect debris objects in image and telemetry data reported by satellite group 410. Terrestrial systems 401 may track satellite group constraints, such as processing capacity, technological ability, power constraints, and the like. Terrestrial systems 401 may provide inputs such as maneuvers, debris deorbiting commands, and the like. In some examples, terrestrial systems 401 may comprise observational capabilities to detect, track, and relay debris orbital information to satellite group 410. The one or more maneuvers can include moves required to reach the target area, a desired group shape, and the like. Terrestrial systems 401 can transfer control signaling to multi-agent satellite group 410 to modify the orbit of the spacecraft that comprise the group, the shape of the group, and the focus area of the group to intercept and deorbit debris 421. For example, terrestrial systems 401 may generate maneuver commands that comprise burn times for satellite mounted thrusters to adjust the orbital position and spatial orientation of satellites 411 to position the shared focus point of satellite group 410 at a location co-located with the debris 421. Terrestrial systems 401 may upload the task(s) and other information to the satellite group to execute requests.

Although illustrated as a multi-agent group, in some examples satellites 411 may comprise a group of individual satellites with various primary functions. In response to the detection of debris 421, either by one or more of the satellites or terrestrial observation, terrestrial systems 401 (or one of satellites 411) generate and transfer command signaling to satellites 411 to form multi-agent satellite group 410. In doing so, satellites 411 coordinate to form multi-agent group 410 only when necessary (e.g., to irradiate a debris object) and then return to their primary functions once the task is complete. For example, satellites 411 may comprise communication relays and form multi-agent satellite group 410 in response to the detection of debris 421 and then disband group 410 when debris 421 is deorbited. It should be appreciated that the above scenarios and others not mentioned can be accomplished using any computing device, ground station, or any combination thereof. Although illustrated as comprising multiple satellites, in some examples group 410 comprises a single satellite.

Figure 5:
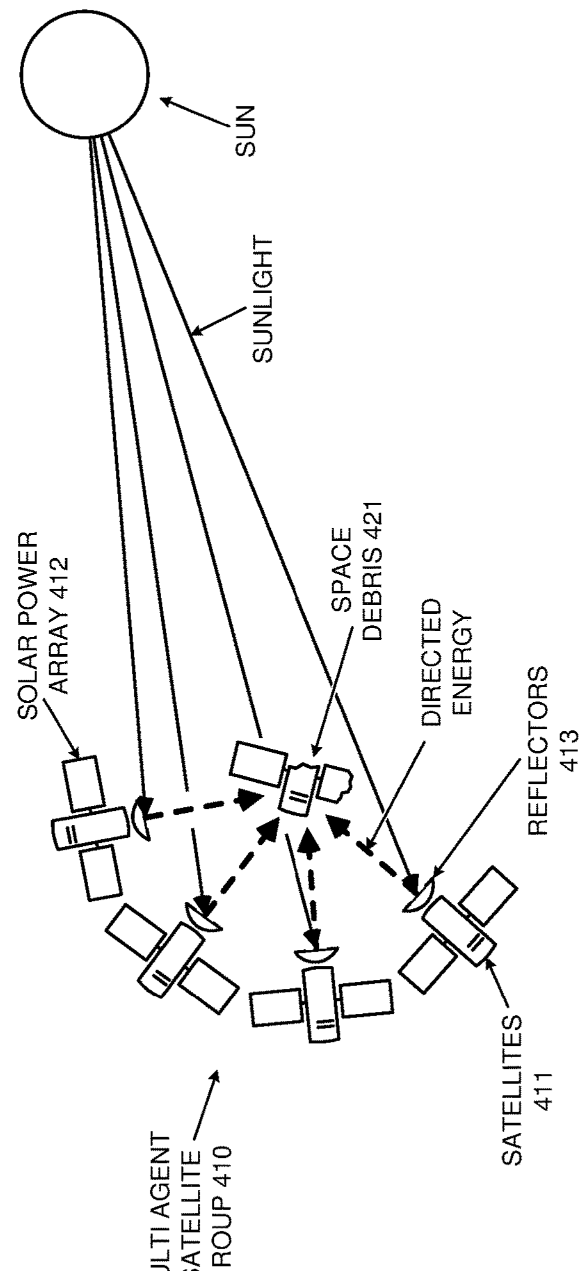
FIG. 5 further illustrates the distributed directed energy array.
Figure 5:
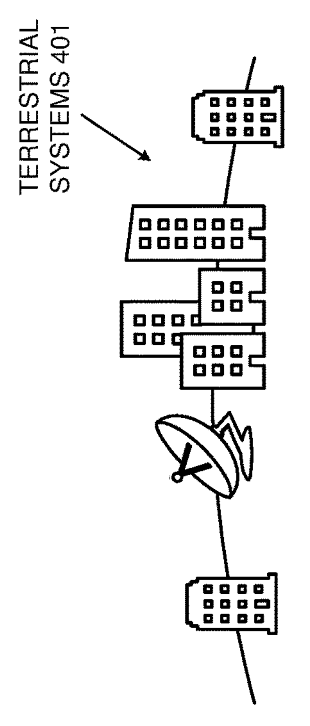

FIG. 5 illustrates view 500. View 500 illustrates an example of multi-agent satellite group 410 deorbiting space debris 421 after receiving a deorbit command from terrestrial systems 401. As illustrated in FIG. 5, satellites 411 of group 410 arrange themselves autonomously to position a shared focal point of group 410 at a spatial location co-located with debris 421. When the focal point and debris 421 are co-located, reflectors 413 reflect sunlight to the shared focal point. The reflected and focused sunlight heats space debris 421 so that a portion of debris 421 sublimates. The resulting sublimation plume alters the trajectory of debris 421, typically reducing the velocity of debris 421, so that debris 421 deorbits. During reentry, space debris 421 burns up in the Earth's atmosphere and therefore no longer poses a threat to active satellites, space stations, and personnel in low-earth orbit.

Advantageously, the distributed directed energy array formed by terrestrial systems 401 and multi-agent satellite group 410 effectively and efficiently protects space assets from space debris. Moreover, multi-agent satellite group 410 meets the technical and economic requirements in order to be implemented for the removal of small orbital debris.

Figure 6:
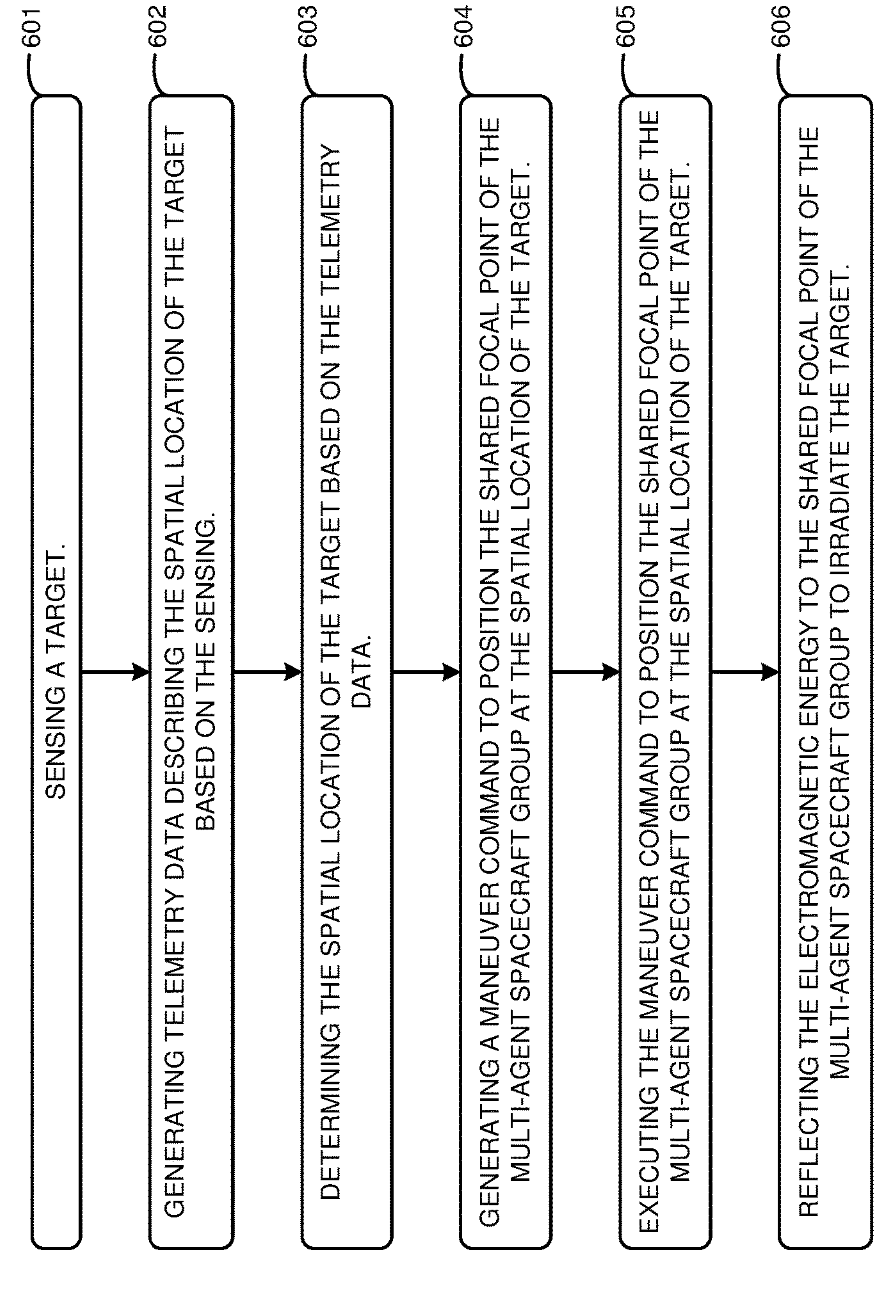
FIG. 6 illustrates an exemplary operation of the distributed directed energy array.

FIG. 6 illustrates process 600. Process 600 comprises an exemplary operation of multi-agent satellite group 410 to deorbit a debris target. Process 600 comprises an example of process 300 illustrated in FIG. 3, however process 300 may differ. The operations of process 600 comprise sensing a target (step 601). The operations further comprise generating telemetry data describing the spatial location of the target based on the sensing (step 602). The operations further comprise determining the spatial location of the target based on the telemetry data (step 603). The operations further comprise generating a maneuver command to position the shared focal point of the multi-agent spacecraft group at the spatial location of the target (step 604). The operations further comprise executing the maneuver command to position the shared focal point of the multi-agent spacecraft group at the spatial location of the target (step 605). The operations further comprise reflecting the electromagnetic energy to the shared focal point of the multi-agent spacecraft group to irradiate the target (step 606).

Figure 7:
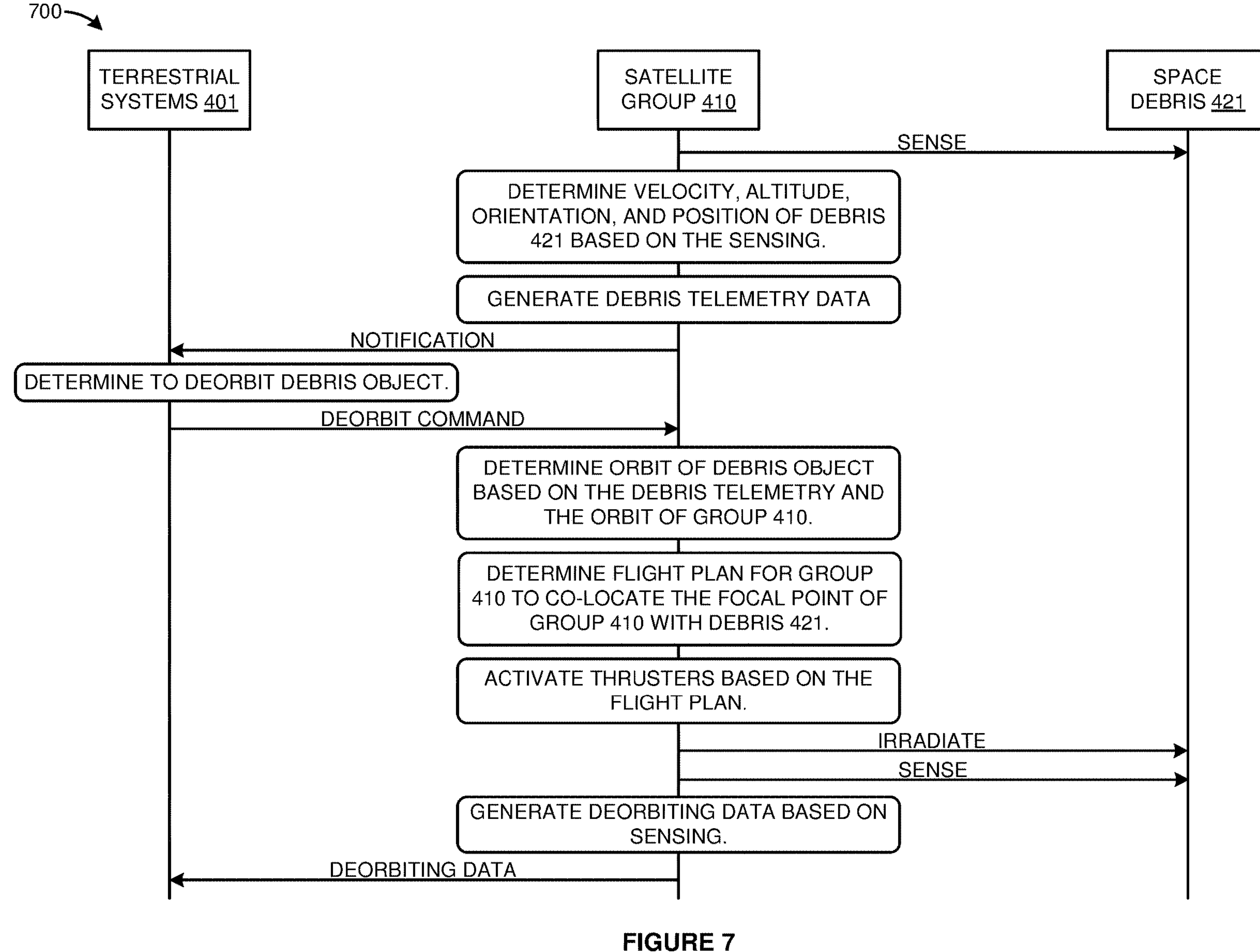
FIG. 7 illustrates an exemplary operation of the distributed directed energy array.

FIG. 7 illustrates process 700. Process 700 comprises an exemplary operation of multi-agent satellite group 410 and terrestrial systems 401 to deorbit space debris 421. Process 700 comprises an example of process 300 illustrated in FIG. 3 and process 600 illustrated in FIG. 6, however processes 300 and 600 may differ. In some examples, satellite group 410 senses space debris 421. For example, satellites 411 may image, ping with radar, ping with lidar, or other use other sensing technologies to characterize the relative location and trajectory of debris 421. Satellites 411 determine the velocity, altitude, orientation, position, and/or other telemetry data that describes the trajectory of debris 421 based on the sensing. Satellites 411 generate telemetry data for debris 421 that includes the determined trajectory characteristics (e.g., orbit) of debris 421 and wirelessly transfers the debris telemetry to other satellites in group 410.

Satellites 411 transfer a notification to terrestrial systems 401 indicating the detection of debris 421. The notification may include debris telemetry data generated by satellite group 410. Terrestrial systems 401 approves the deorbiting mission and transfers a deorbiting command to group 410. Terrestrial systems 401 may approve deorbiting missions based on the debris telemetry. For example, terrestrial systems 401 may compare the debris telemetry data to one or more deorbiting thresholds. Exemplary thresholds include object size, orbital path, object velocity, object rotation rate, and the like. When the telemetry data triggers one or more of the deorbiting thresholds, terrestrial systems 401 approves the deorbiting mission and transfers the deorbiting command to group 410. These thresholds allow group 410 to avoid targeting space assets and allow terrestrial systems 401 to approve deorbiting missions without human intervention. In some examples, terrestrial systems 401 may host AI algorithms, neural networks, or other types of deep learning systems to approve deorbiting missions.

Satellite group 410 receives the deorbiting command from terrestrial systems 401 and responsively initiates a deorbiting operation. Satellites 411 exchange telemetry data with each other to track the trajectory of group 410. Satellites 411 calculate the orbit of space debris 421 based on the debris telemetry data and the known orbital characteristics of group 410. Satellites 411 generate and maintain a digital twin of debris 421 based on the sensed telemetry data for debris 421. The digital twin identifies the velocity, spatial location, orbital period, and/or other orbital characteristics of debris 421. For example, the shared telemetry data may describe the location of debris 421 in relation to group 410, the distance between group 410 and debris 421, the orbital plane of debris 421, and the difference in speed between group 410 and debris 421. Using the known orbital characteristics of group 410 and the relative location, distance, orbital plane, and speed difference of debris 421, satellites 411 may construct a digital twin of space debris 421 that depicts the orbit of debris 421.

Once the orbit of space debris 421 is determined, each of satellites 411 determines a flight plan to position the shared focal point of satellite group 410 at the location of target 421. The flight plans include a set of maneuvers for each of satellites 411 to co-locate the shared focal point of group 410 with the spatial location of debris 421. The flight plans may indicate specific thrusters to activate, burn times, orientations, locations, group shapes, and the like for each of satellites 411. For example, the flight plans for satellites 411 may position and orient each of satellites 411 so that the focal point for each of reflectors 413 targets space debris 421. Satellites 411 may wirelessly share their flight plans with each other to avoid conjunctions. Each of satellites 411 executes their respective flight plans. Satellites 411 activate their thrusters based on the flight plans to maneuver the focal point of group 410 to be co-located with debris 421. When the focal point and debris 421 become co-located, reflectors 413 of satellites 411 reflect and focus sunlight towards debris 421. The reflected/focused sunlight heats debris 421 causing a portion of debris 421 to sublimate. The sublimation plume produces an impingement thrust on debris 421. The thrust causes debris 421 to slow and begin deorbiting. Satellite group 410 senses debris 421 to characterize the results of the deorbiting operation. For example, satellites 411 may take still frame images and/or video of debris 421 after irradiation of debris is complete.

Group 410 generates and wirelessly transfers the deorbiting data to terrestrial systems 401. Terrestrial systems 401 may assess the effectiveness of the deorbiting operation based on the received deorbiting data and the known orbital characteristics of group 410. When terrestrial systems 401 determine that debris 421 will deorbit, terrestrial systems 401 direct group 410 to enter into a detection mode to scan for new space debris targets. When terrestrial systems 401 determine that debris 421 will not deorbit, terrestrial systems 401 transfer a subsequent deorbiting command to group 410. Group 410 receives the subsequent deorbiting command and generates new flight plans to further irradiate debris 421. The new flight plans may include a set of maneuvers (e.g., thruster activations and burn times) for each of satellites 411 to co-locate the shared focal point of group 410 with the spatial location of debris 421.

Figure 8:
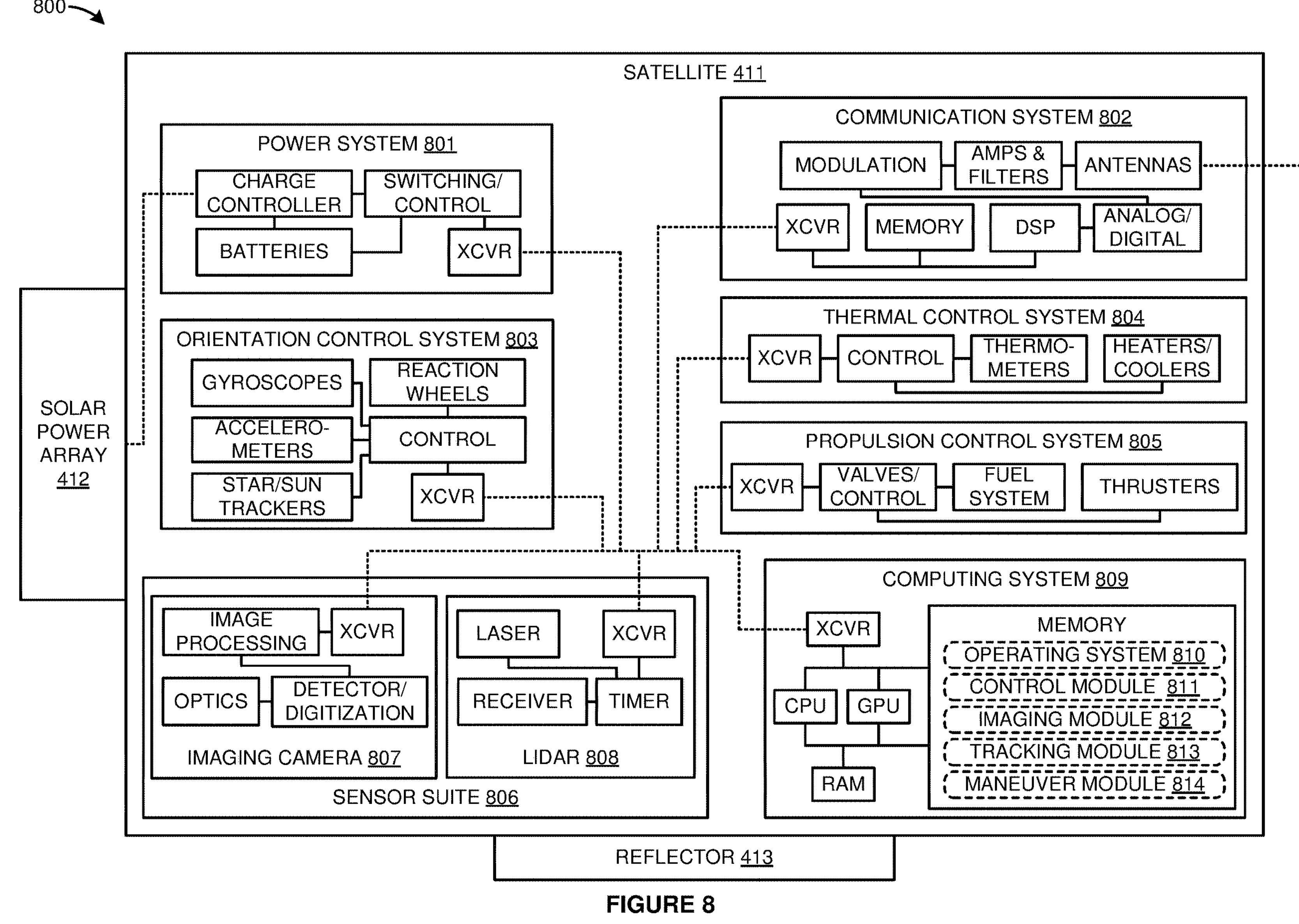
FIG. 8 illustrates a satellite in the distributed directed energy system.

FIG. 8 comprises view 800. View 800 illustrates an example of satellites 411 in multi-agent group 410. Satellites 411 comprise an example of spacecrafts 110 illustrated in FIGS. 1 and 2, however spacecrafts 110 may differ. In this example, satellites 411 are referred to in the singular for sake of clarity. Satellite 411 comprises solar power array 412, reflector 413, power system 801, communication system 802, orientation control system 803, thermal control system 804, propulsion control system 805, sensor suite 806, and computing system 809. Sensor suite 806 comprises imaging camera 807 and lidar 808. In other examples, satellite 411 may comprise additional or different components than those illustrated in FIG. 8.

Power system 801 provides electrical power to the other components in satellite 411. Power system 801 comprises a charge controller, batteries, switching/control circuitry, and transceivers (XCVR) connected over bus circuitry. The charge controller is operatively coupled to solar power array 412. The transceivers are coupled over a communication bus to a transceiver in computing system 809. Solar panel array 412 absorbs sunlight and converts the absorbed sunlight to electricity. Solar panel array 412 transfers the electricity to the charge controller in power system 801. The charge controller distributes the received electricity to the batteries. For example, the charge controller may charge batteries that are not at capacity and avoid charging batteries that are at capacity. The switching/control circuitry selects ones of the batteries to use to power the other components of satellite 411. For example, the switching/control circuitry may connect/disconnect the batteries to the power transmission system in satellite 411 based on their charge. The power transmission system connecting power system 801 to the other components of satellite 411 is omitted for clarity.

Communication system 802 provides communication links between satellite 411 and terrestrial systems 802 and between satellite 411 and the other satellites in group 410. Communication system 802 comprises antennas, amplifiers and filters, modulation, analog/digital converters, DSP, memory, and transceivers connected over bus circuitry. The transceivers are coupled to a transceiver in computing system 809. The antennas are wirelessly coupled to terrestrial systems 401 and to other satellites in group 410. In some examples, lasers may replace or be used in addition to the antennas to provide optical communication links. The antennas wirelessly exchange signaling (e.g., flight plans, orbital characteristics, etc.) with terrestrial systems 401 and/or other satellites in group 410. The antennas exchange corresponding electrical signals through duplexers with the amplifiers. The amplifiers boost the electrical signals, and the filters attenuate unwanted energy. Demodulators down-convert the amplified signals from their carrier frequencies and the analog/digital interfaces convert the demodulated analog signals into digital signals. The DSPs process the digital signals and exchange the digital signals with the transceiver. The transceiver exchanges the digital signals with a transceiver in computing system 809.

Orientation control system 803 tracks and controls the spatial orientation (e.g., pitch, yaw, and roll) of satellite 411. Orientation control system 803 comprises gyroscopes, accelerometers, star and sun trackers, reaction wheels, control circuitry, and a transceiver connected over bus circuitry. The transceiver is coupled to a transceiver in computing system 809. The gyroscopes maintain the orientation of satellite 411. The gyroscopes may measure and report the orientation of satellite 411 to the control circuitry. The accelerometers measure the acceleration and deceleration of satellite 411 and report the measurements to the control circuitry. The star and sun trackers comprise imaging systems (e.g., cameras, photocells, etc.) that view the stars and sun to track the orientation (i.e., attitude) of satellite 411. The trackers reported the measured orientation to the control circuitry. The reaction wheels comprise flywheels orientated along the three-spatial axes and electric motors to power the flywheels. The reaction wheels control the orientation of satellite 411. For example, the control circuitry may receive an orientation instruction from computing system 809 to rotate satellite 411 and the control circuitry may increase/decrease the speed of the flywheels to rotate satellite 411 around its center of mass to the desired orientation. The control circuitry reports the measured orientation of satellite 411 to computing system 809 and executes orientation commands received from computing system 809.

Thermal control system 804 maintains the temperature of satellite 411. Thermal control system 804 comprises control circuitry, thermometers, heaters/coolers, and transceivers connected over bus circuitry. The transceiver is coupled to a transceiver in computing system 809. The thermometers measure the internal temperature of satellite 411 and report the temperature to the control circuitry. When the measured temperature triggers a low-temperature threshold, the control circuitry activates the heaters to increase the temperature of satellite 411. Likewise, when the measured temperature triggers a high-temperature threshold, the control circuitry activates the coolers to decrease the temperature of satellite 411. The control circuitry reports the measured temperature of satellite 411 to computing system 809.

Propulsion control system 805 controls the spatial position of satellite 411. Propulsion control system 805 comprises thrusters, a fuel system, valves and control circuitry, and a transceiver connected over fuel lines and bus circuitry. The transceiver is coupled to a transceiver in computing system 809. The fuel system stores propellant for the thrusters. When satellite 411 needs to modify its orbit (e.g., to deorbit space debris 421), the control circuitry receives a thruster activation command from computing system 809 over the transceiver. The activation command selects ones of the thrusters and corresponding burn times. The control circuitry opens the valves to supply propellant to the selected thrusters. The thrusters burn the propellant to propel satellite 411. The control circuitry closes the valves when the burn times have elapsed.

Sensor suite 806 comprises imaging camera 807 and lidar 808 to image and track target objects (e.g., space debris 421). Imaging camera 807 comprises optics, photon detection and digitization circuitry, image processing circuitry, and transceivers connected over bus circuitry. In other examples, sensor suit 807 may comprise additional sensors (e.g., radar arrays) to detect and characterize target objects (e.g., debris 421) however the additional sensors are omitted for clarity. The optics comprise components like lenses and mirrors to capture photons that depict target objects. The photons enter the optics and are passed to the detector/digitation circuitry. The detector/digitization circuitry comprises a Focal Plane Array (FPA) of micrometer size pixels. The pixels may be constructed from materials sensitive to the photons in the visible spectrum, infrared spectrum, and/or ultraviolet spectrum. The detector/digitation circuitry detects the photons and generates a corresponding digital signal that represents the target object and surrounding environment and passes this signal to the image processing circuitry. The image processing circuitry comprises components like DSPs to translate the digital signal into an image. The transceiver transfers the resulting image to a transceiver in computing system 809. Lidar 808 comprises a laser, receiver, timer, and transceiver connected over bus circuitry. The laser beams a target object (e.g., debris 421) and the receiver detects the reflected beam. The timer measures the elapsed time between emission and detection to determine the distance between satellite 411 and the target. The transceiver transfers the measured distance to a transceiver in computing system 809.

Computing system 809 controls the operation of the other components of satellite 411 to detect space debris, report debris characteristics to terrestrial systems 401, implement deorbiting commands received from terrestrial systems 401, and interface with other satellites in group 410. Computing system 809 comprises CPU, GPU, RAM, transceivers, and memory connected over bus circuitry. The memory stores operating system 810, control module 811, imaging module 812, tracking module 813, and maneuver module 814. The CPU retrieves and executes the software stored by the memory to drive the operation of satellite 411. Operating system 810 manages the hardware/software resources of computing system 809. Control module 811 comprises capabilities for satellite component control, debris telemetry reporting, flight plan implementation, and inter-satellite interfacing. Imaging module 812 comprises capabilities for debris object detection and imaging system control. Tracking module 813 comprises capabilities for debris object orbit, velocity, altitude, orientation, and position determination. Maneuver module 814 comprises capabilities for satellite position control and satellite orientation control. In some examples, modules 811-813 may generate a digital twin of a debris object based on debris telemetry data generated by sensor suite 806. Computing system 809 stores the digital twin in memory. The digital twin tracks the orbital characteristics of the target. Control module 811 may generate a flight plan for satellite 411 to locate the focal point of reflector 413 with the debris object based on the digital twin. Control module 811 may drive maneuver module 814 to implement the flight plan.

In some examples, computing system 809 hosts a Rendezvous Proximity Operations (RPO) algorithm that uses a Deep Neural Network (DNN) trajectory-planning model with a reinforcement learning process designed to autonomously plan an ingress, mission, egress maneuver pipeline for both Passive Relative Orbits and Active Relative Orbits (PRO/ARO). Computing system 809 may comprise a payload suite of two Flight Software (FSW) packages capable of autonomous RPO maneuver planning and Resident Space Object (RSO) 3D reconstruction. Each of satellites 411 in group 410 may host the RPO maneuver stack depending on the nature of the operation, allowing scalability, and dynamic mission responses. The FSW may comprise computer vision algorithms built on Neural Radiance Fields (NRF) that can do pose extraction and 3D surface reconstruction of an RSO at the edge, allowing dynamic determination of vehicle characteristics such as roll rates, moments of inertia, and SWaP. Pairing these two software packages together, Satellite 411 may respond to evasive actions from the RSO at the edge while optimizing fuel, target surface imaging (gaps in data), and time on target allowing response and adaptation to changing conditions. Satellite 411 may monitor and identify RSO evasive actions to build a database for the RSO outlining the spacecraft characteristics such as actuation ability, response time, maneuver capabilities, and the like. Computing system 809 may perform full mission operations at the edge and support any and all follow-on mission capabilities in close proximity or upon capture of the RSO. Computing system 809 may perform fully Autonomous-RPO (A-RPO) and A-RPO & Capture (A-RPOC) to remove "human in the loop" for autonomous operations reducing cognitive load for the operators.

Figure 9:
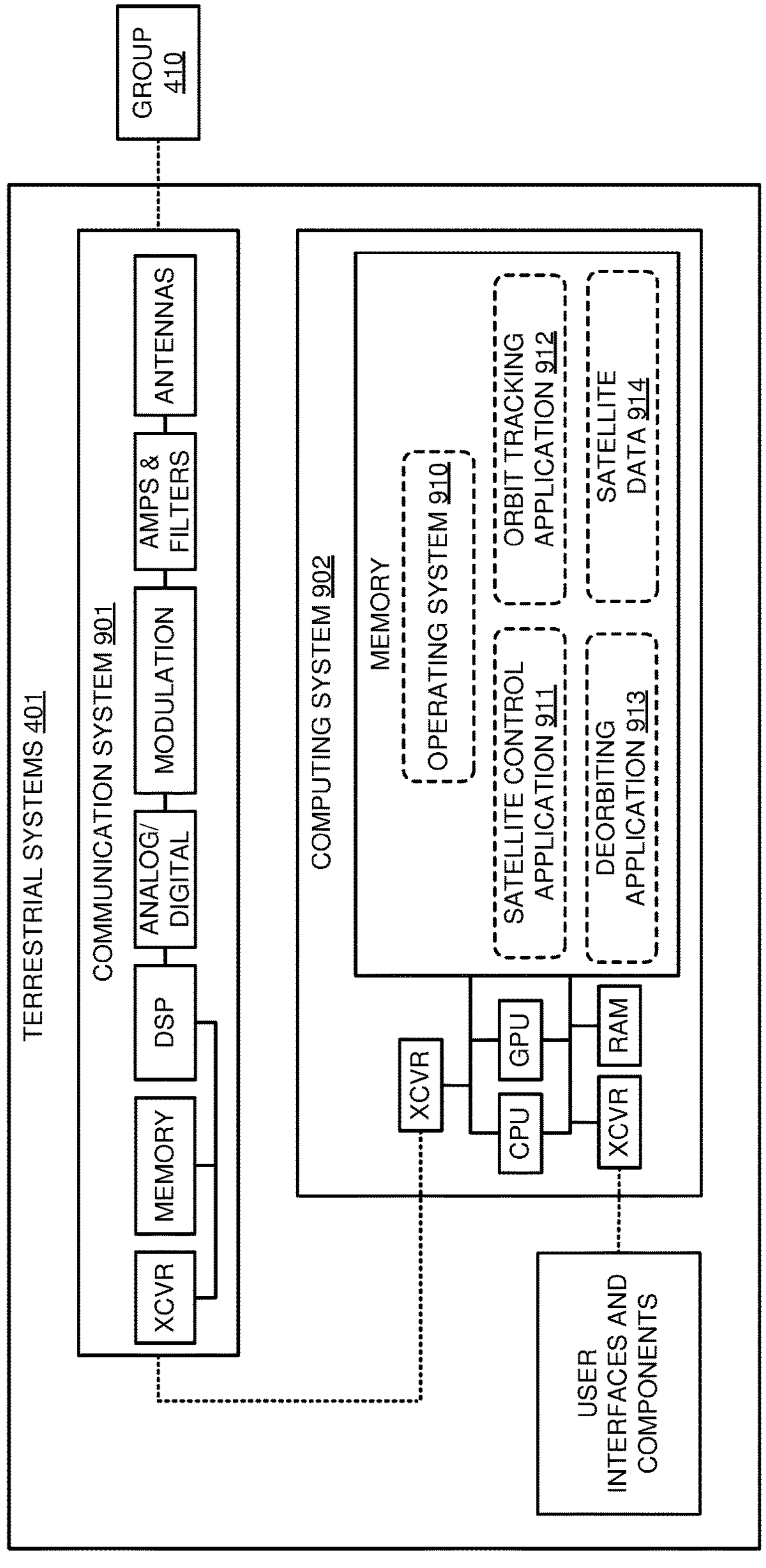
FIG. 9 illustrates a terrestrial system in the distributed directed energy system.

FIG. 9 comprises view 900. View 900 illustrates an example of terrestrial systems 401. Terrestrial systems 401 comprise communication system 901, computing system 902, and user interfaces and components. In other examples, terrestrial systems 401 may comprise additional or different components than those illustrated in FIG. 9. Communication system 901 provides communication links between terrestrial systems 401 and satellite group 410. Communication system 901 comprises antennas, amplifiers and filters, modulation, analog/digital converters, DSP, memory, and transceivers connected over bus circuitry. The transceivers are coupled to a transceiver in computing system 902. The antennas are wirelessly coupled to satellite group 410. In some examples, lasers may replace or be used in addition to the antennas to provide optical communication links. The antennas wirelessly exchange signaling (e.g., flight plans, orbital characteristics, etc.) with satellite group 410. The antennas exchange corresponding electrical signals through duplexers with the amplifiers. The amplifiers boost the electrical signals and the filters attenuate unwanted energy. Demodulators down-convert the amplified signals from their carrier frequencies and the analog/digital interfaces convert the demodulated analog signals into digital signals. The DSPs process the digital signals and exchange the digital signals with the transceiver. The transceiver exchanges the digital signals with a transceiver in computing system 902.

Computing system 902 controls the operation of the other components of terrestrial systems 401, tracks the orbit of multi-agent satellite group 410, and approves deorbiting missions for group 410. Computing system 902 comprises CPU, GPU, RAM, transceivers, and memory connected over bus circuitry. A transceiver in computing system 902 is coupled to a transceiver in communication system 901. A transceiver in computing system 902 is coupled to the user interfaces and components. The memory stores operating system 910, satellite control application 911, orbit tracking application 912, deorbiting application 913, and satellite data 914. The CPU retrieves and executes the software stored by the memory to drive the operation of terrestrial systems 401. Operating system 910 manages the hardware/software resources of computing system 902. Satellite control application 911 comprises capabilities for flight plan generation, deorbiting assessment, satellite group formation, satellite group shape control, and satellite group dissolution. Orbit tracking application 912 comprises capabilities for satellite orbit tracking, debris orbit determination, and debris orbit tracking. Deorbiting application 913 comprises capabilities for group focal point/debris colocation, ablation time determination, and deorbiting confirmation. Satellite data 914 comprises data that tracks the orientation, group shape, group focal point spatial location, satellite health, and/or other data describing the status of satellites 411.

Figure 10:
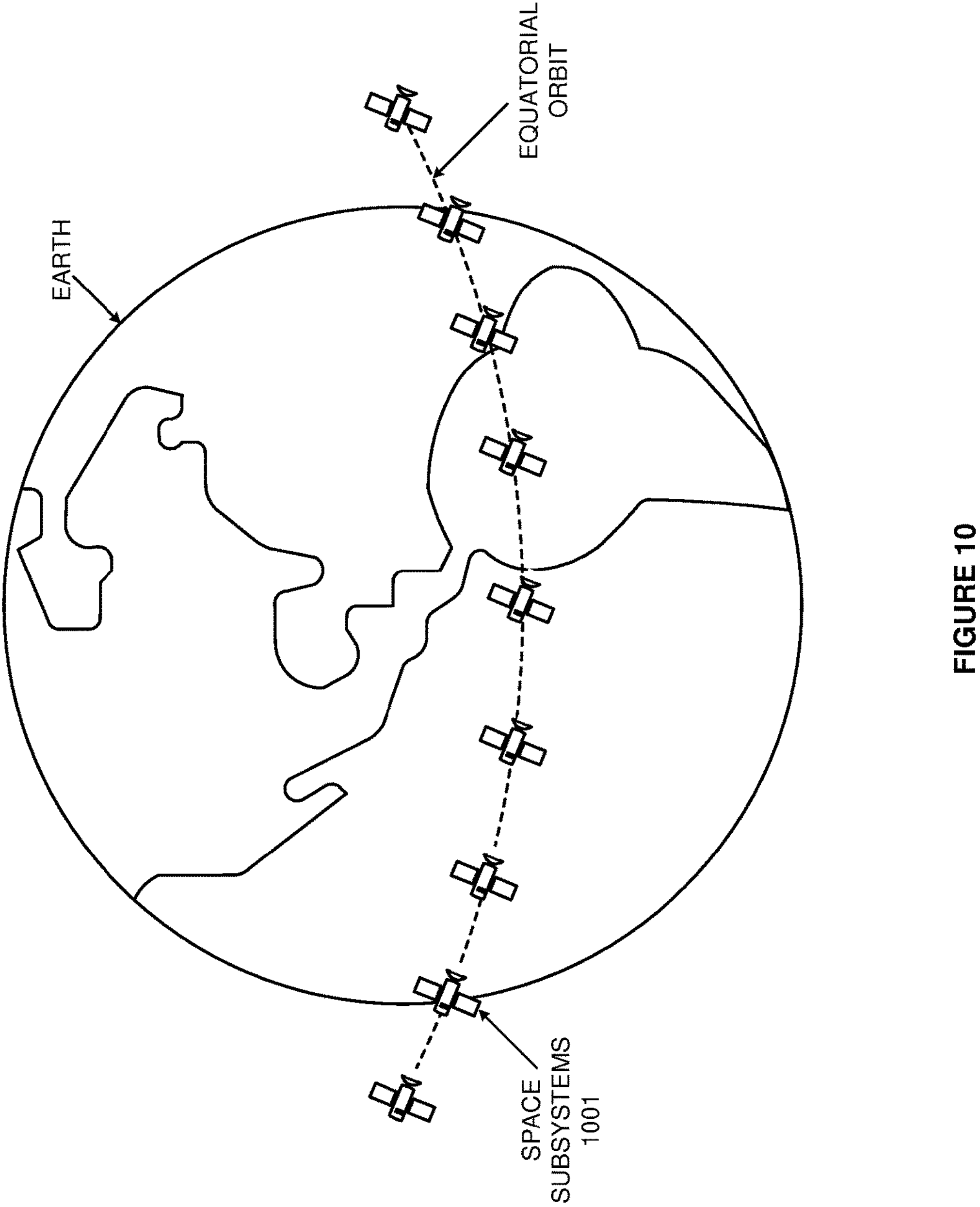
FIG. 10 illustrates an exemplary orbital configuration for a distributed directed energy system.

FIG. 10 comprises view 1000. View 1000 illustrates an example of space subsystems 1001 that are organized in the equatorial orbit plane. The satellites that form space subsystems 1001 may comprise multi-agent satellite groups like small satellite swarms that form distributed directed energy systems. The space subsystems may implement applications to concentrate, relay, reflect energy or electromagnetic waves, waveforms, laser(s), microwave beam(s), solar rays, and the like include debris remediation, communication, space domain awareness, heat and power, and hydrogen extraction. Although illustrated on an equatorial orbit, the space subsystems may be positioned on another type of orbit like an inclined orbit or polar orbit.

Figure 11:
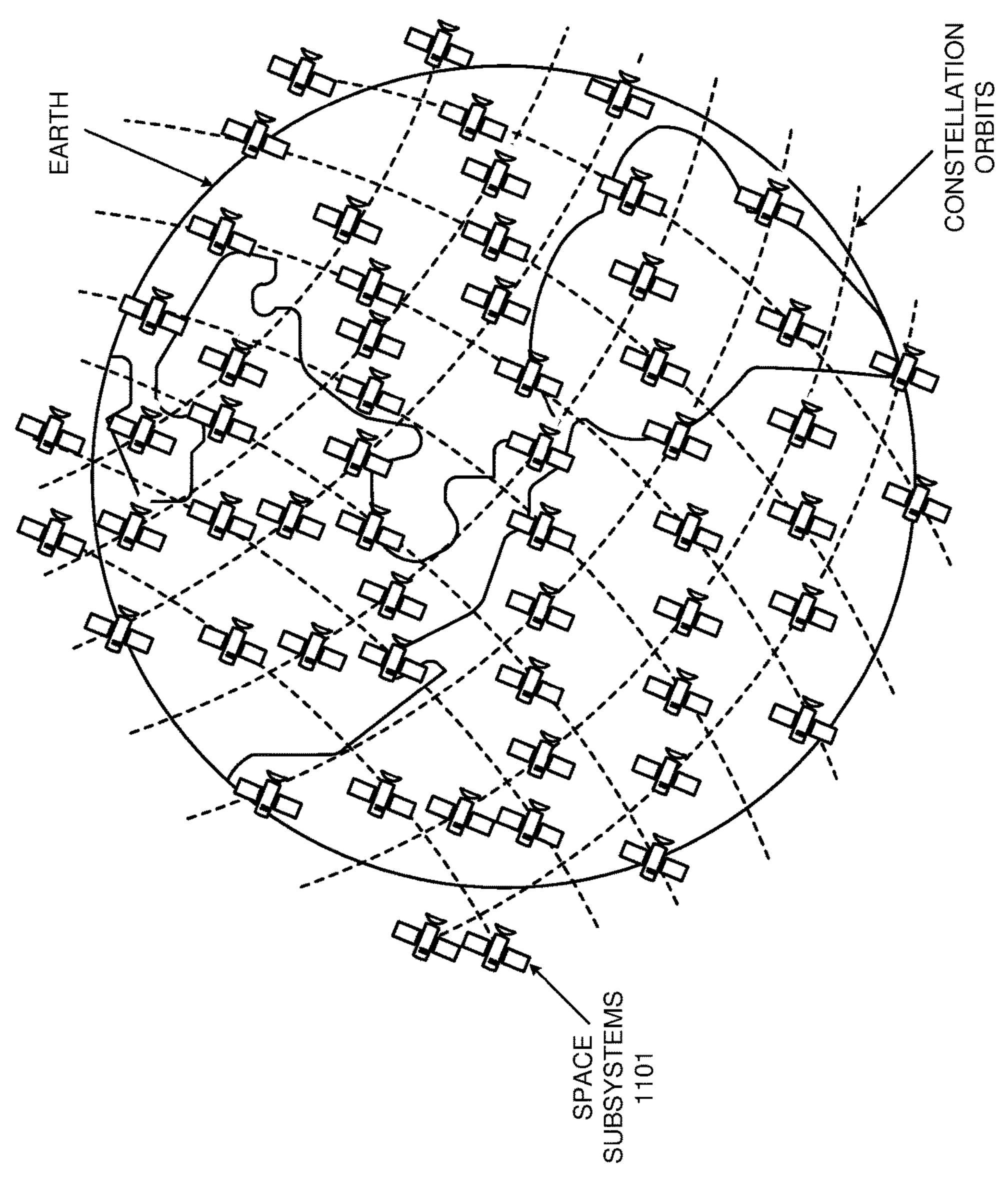
FIG. 11 illustrates another exemplary orbital configuration for a distributed directed energy system.
Figure 11:

FIG. 11 comprises view 1100. View 1100 illustrates an example of a distributed directed energy satellite constellation comprising space subsystems 1101. Space subsystems 1101 comprise multi-agent satellite groups that form distributed directed energy systems. Space subsystems 1101 may implement applications to concentrate, relay, reflect energy or electromagnetic waves, waveforms, laser(s), microwave beam(s), solar rays, and the like include debris remediation, communication, space domain awareness, heat and power, and material extraction.

Figure 12:
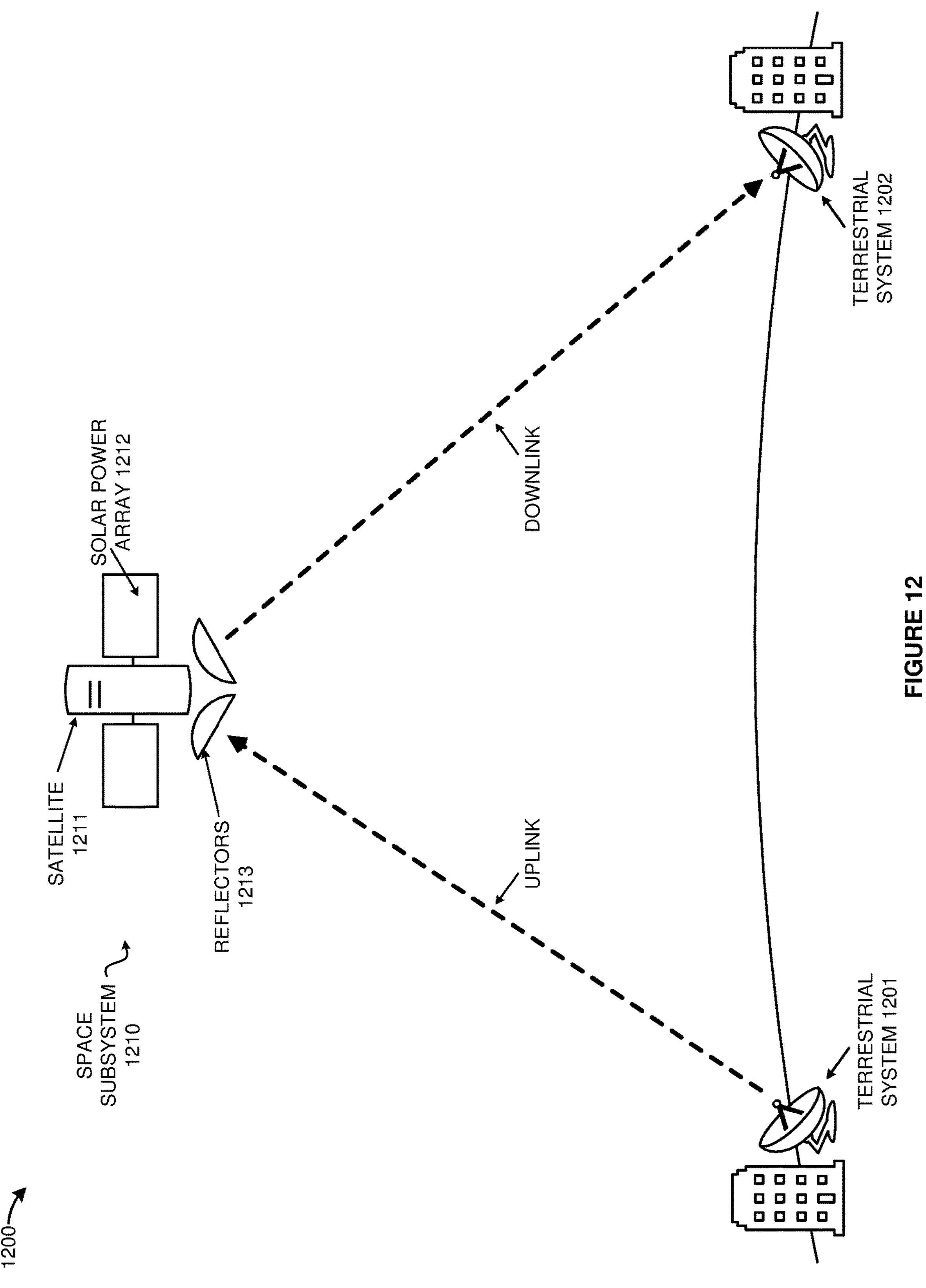
FIG. 12 illustrates an exemplary communication system.

FIG. 12 comprises view 1200. View 1200 illustrates an example of space subsystem 1210 to relay information from one point to another on a celestial body (e.g., the Earth). Space subsystem 1210 comprises satellite 1211, solar power array 1212, and reflectors 1213. The relayed information may comprise data, voice, text, videos, energy, electromagnetic waves, and the like. Space subsystem 1210 relays communications from uplink terrestrial system 1201 to downlink terrestrial system 1202. In some examples, subsystem 1210 instead comprises multiple satellites that form a multi-agent satellite group. Subsystem 1210 forms an antenna(s) for both coherent and non-coherent waveforms. An intelligent arrangement can help optimize translating non-coherent waveforms into data needed with minimal loss. Subsystem 1210 may be used to minimize latency for transmitting large amounts of data between systems in different orbits, the same orbit, and bodies in interstellar space. Subsystem 1210 may be used for communications between spacecrafts, satellites, between Earth and other satellites, or locations in space to meet deep space communication needs. Subsystem 1210 may bring together and process coherent and non-coherent signals. High Speed Crosslinks between multi-agent satellite groups are used for updating genetic algorithms and avoid conjunctions. Subsystem 1210 can act as a dual function directed energy concentrator, communication relay, and/or laser crosslink relay. Subsystem 1210 may be used to read the source of electromagnetic waves from Earth or other celestial body and further can be redirected to reflect to the source or other targeted location. Subsystem 1210 may be configured to provide input/output to or from a telescope.

Figure 13:
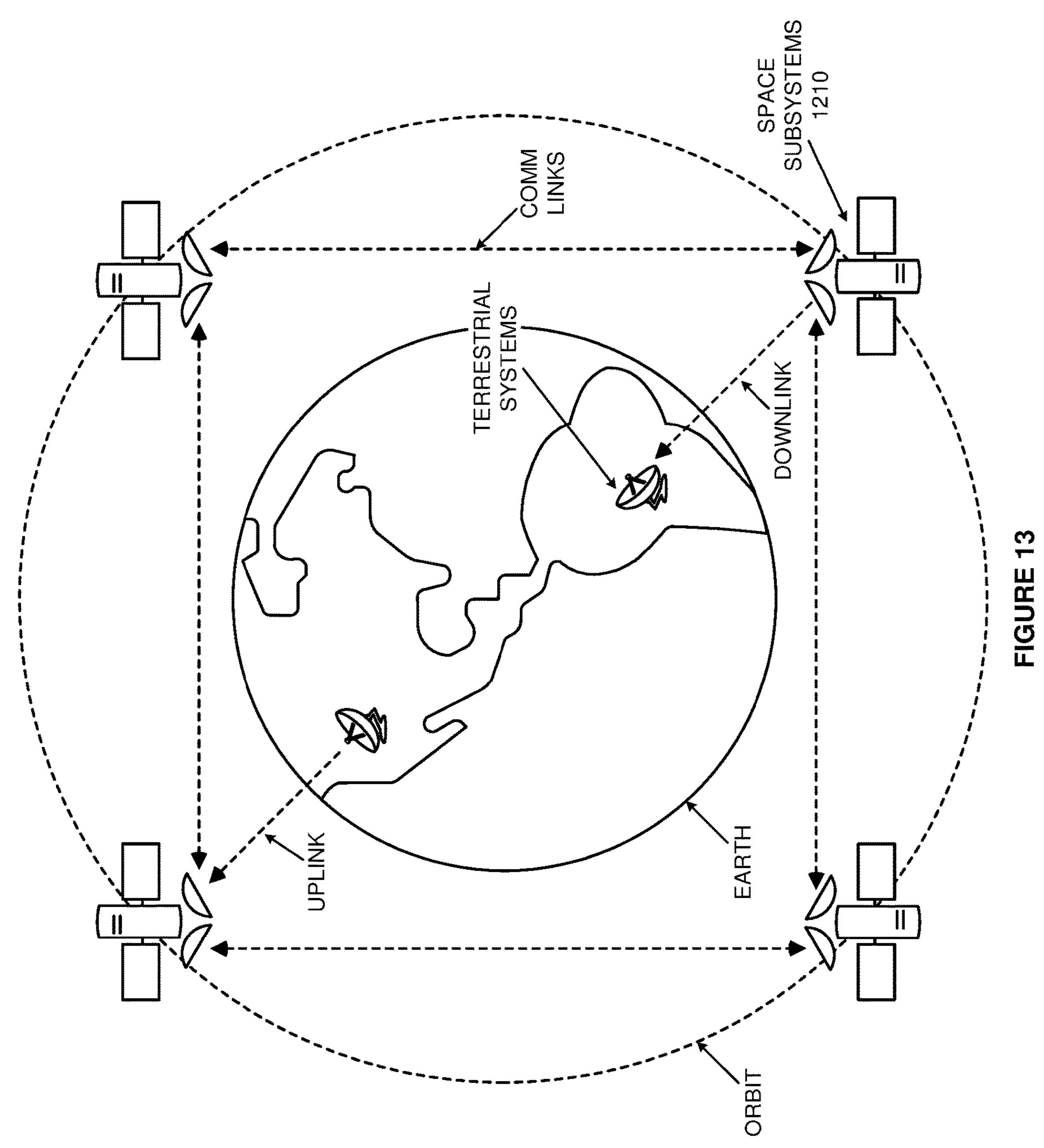
FIG. 13 illustrates an exemplary communication system.

FIG. 13 comprises view 1300. View 1300 illustrates an example of space subsystems 1210 to relay information from one location to another on the surface of Earth. Subsystems 1210 comprise reflectors to reflect signaling to and from ground stations and between each other. Space subsystems 1210 are positioned in orbit around Earth. Subsystems 1210 may comprise satellite groups or single satellites. In some examples, subsystems 1210 receive uplink signaling from a terrestrial based ground station. Subsystems 1210 reflect the uplink communications from the sending terrestrial system towards the target terrestrial system as downlink. Although illustrated as reflecting communications between two ground stations, subsystems 1210 may be relay communications between ground systems and space-based systems like a space station or deep space installation.

Figure 14:
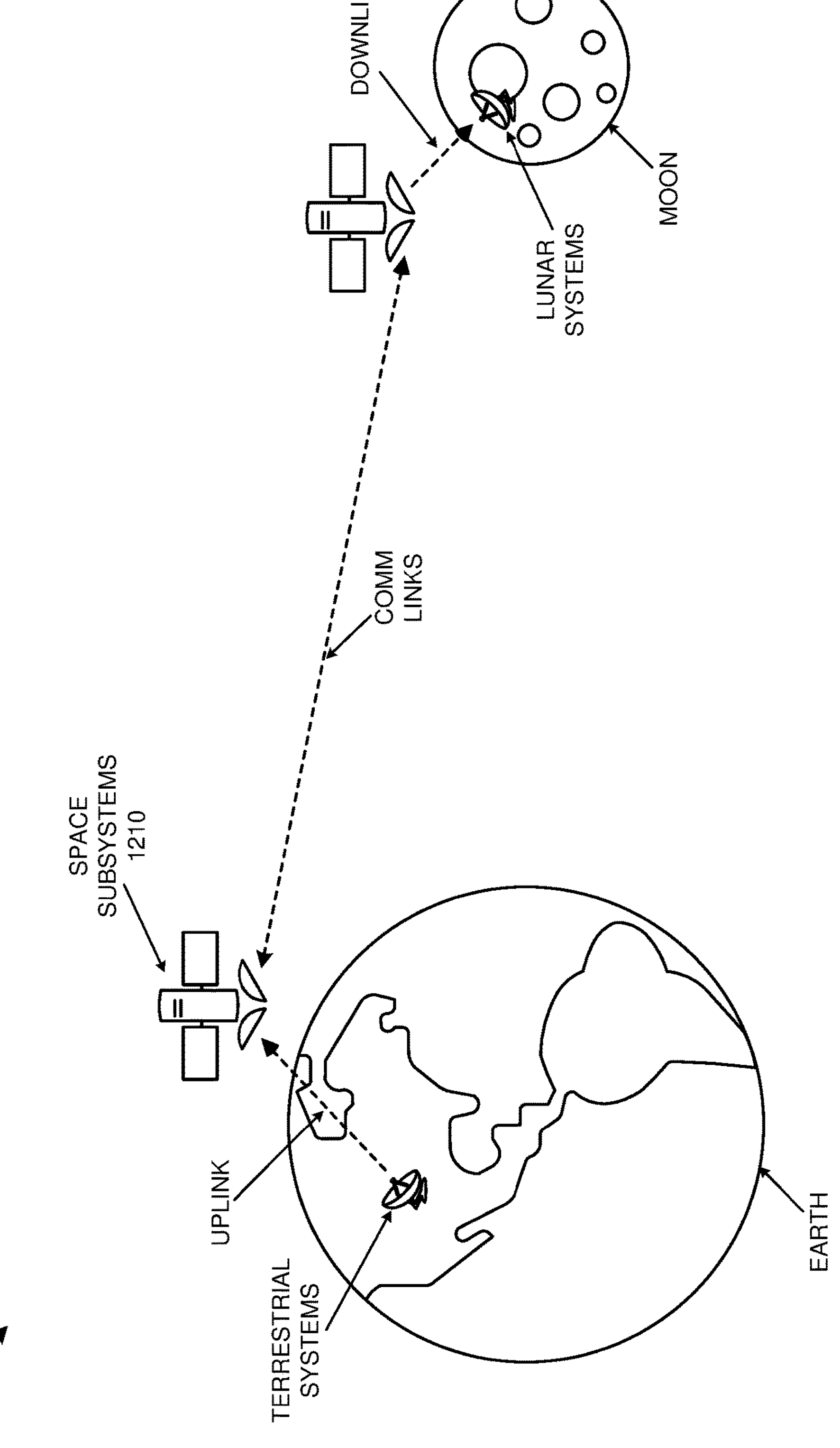
FIG. 14 illustrates an exemplary communication system.

FIG. 14 comprises view 1400. View 1400 illustrates an example of space subsystems 1210 to relay information from between the Earth and the Moon. Subsystems 1210 comprise reflectors to reflect signaling to and from ground stations and between each other. Space subsystems 1210 are positioned in orbit around Earth and the Moon. Subsystems 1210 may comprise satellite groups or single satellites. In some examples, subsystems 1210 receive uplink signaling from a terrestrial based ground station on Earth. Subsystems 1210 reflect the uplink communications towards the target lunar system as downlink. Although illustrated as reflecting communications between the Earth and the Moon, in other examples, subsystems 1210 may be used to reflect communications between other celestial bodies like Mars or Venus.

Figure 15:
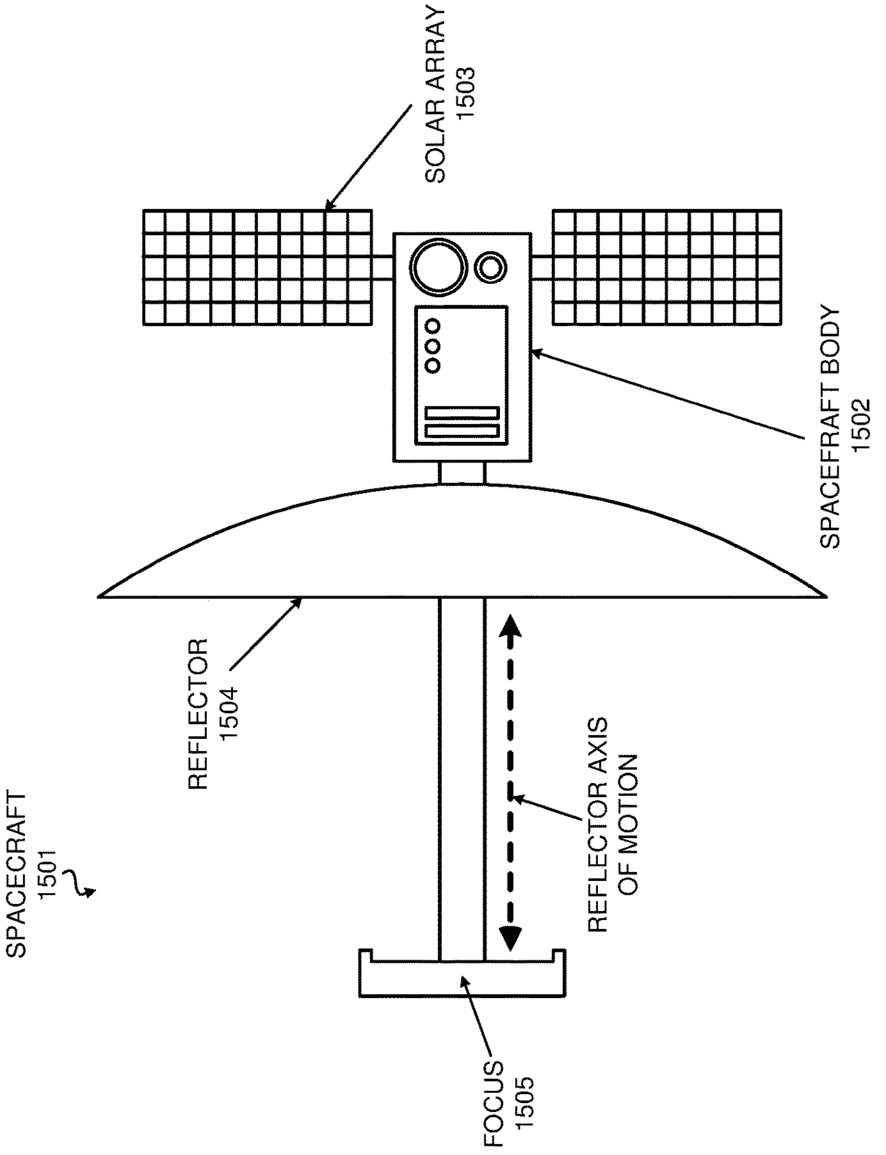
FIG. 15 illustrates an exemplary spacecraft.

FIG. 15 comprises view 1500. View 1500 illustrates an example of spacecraft 1501 according to various embodiments of the present technology. Spacecraft 1501 comprises spacecraft body 1502, solar array 1503, reflector 1504, and focus 1505. Reflector 1504 comprises a parabolic dish. Reflector 1504 may be maneuvered along its central axis connecting spacecraft body 1502 and focus 1505. For example, reflector 1504 may move along an axis parallel to focus 1505 to adjust the distance between reflector 1504 and focus 1505. The distance may be selected based on the amount of reflected energy, the power requirements for the application, and/or the insulation in focus 1505. Additionally, reflector 1504 may be folded to further adjust the intensity of the reflected thermal energy. Spacecraft 1501 may be integrated into a multi-agent satellite group and arranged to reflect electromagnetic radiation (e.g., sunlight) to a focal point (e.g., debris location). Alternatively, spacecraft 1501 may be used as a standalone system. For example, instead of operating in a multi-agent group, spacecraft 1501 may operate alone to identify, maneuver to, and reflect energy to a focal point co-located with a target object like a debris object, adversary satellite, communication receiver, and/or another type of target. When operating as a standalone system, spacecraft 1501 may maintain communication links with terrestrial based command and control systems. Although illustrated as comprising a flat geometry, in some examples solar array 1504 may comprise a curved geometry. For example, array 1504 may comprise a parabolic dish shape.

Figure 16:
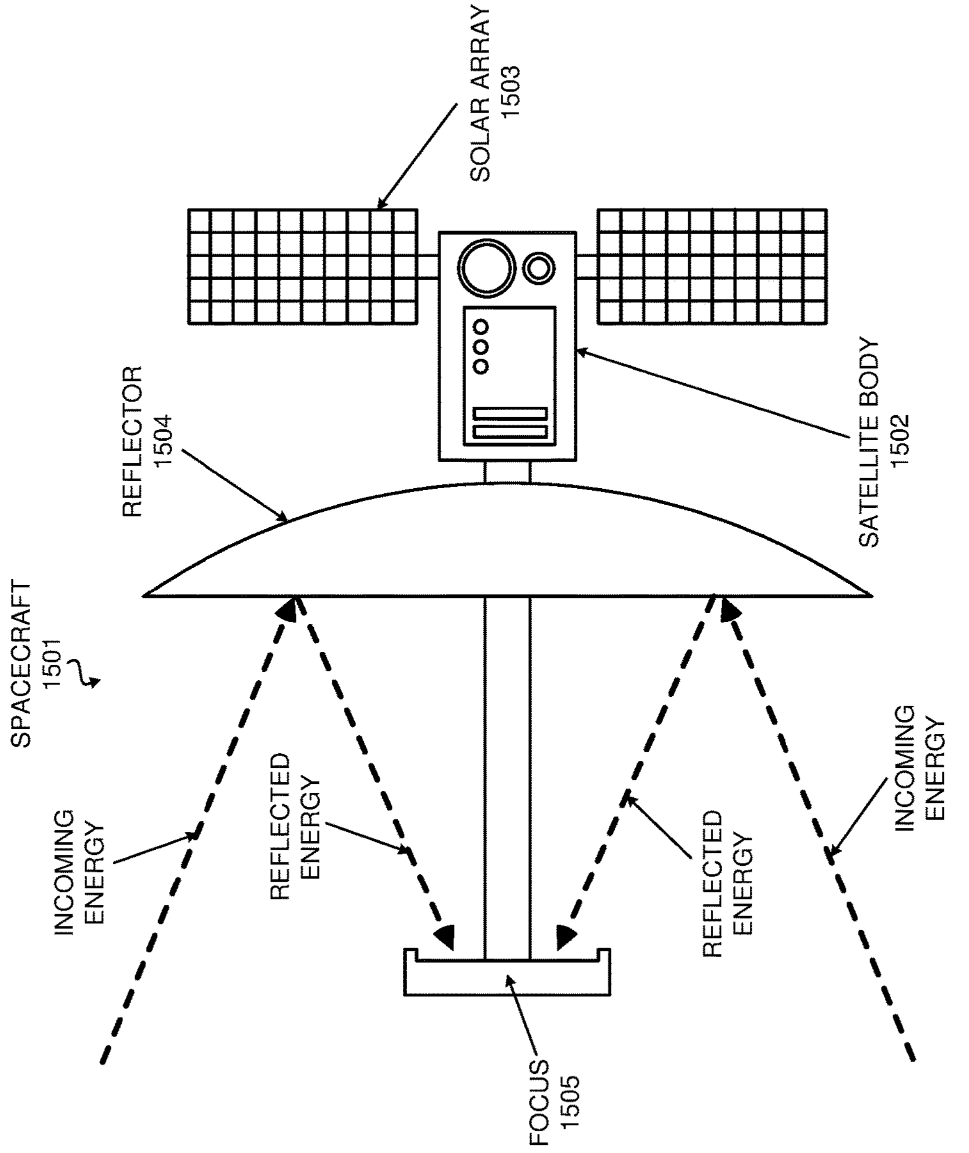
FIG. 16 further illustrates the spacecraft.

FIG. 16 illustrates view 1600. View 1600 further illustrates spacecraft 1501. Solar power array 1503 absorbs electromagnetic radiation to power the subcomponents of spacecraft 1501. Spacecraft 1501 may be integrated into a multi-agent satellite group and arranged to reflect electromagnetic radiation (e.g., uplink signaling) to a focal point (e.g., signaling target). In some examples, focus 1505 may comprise a thermal storage system configured to absorb reflected electromagnetic radiation. The thermal storage system may provide heat for the spacecraft, cooling for the spacecraft, generate and transmit electricity, measure the intensity or composition of the reflected energy, and the like.

In some examples, the thermal storage system may comprise a photovoltaic system and transmission antenna. Reflector 1504 reflects electromagnetic radiation (e.g., sunlight, laser light, and the like) to the photovoltaic system in focus 1505. Reflector 1504 may move along an axis parallel to the focus to change the distance between reflector 1504 and focus 1505 to adjust the intensity of the reflected thermal radiation. The distance may be selected based on the amount of reflected energy, the power requirements for the application, and/or the insulation in focus 1505. The photovoltaic system converts the absorbed radiation into electricity via photovoltaic effect. The transmission antenna converts the electricity into a transmissible form and transfers the converted electricity as a power beam. For example, the power beam may comprise a microwave ray, a laser beam, and the like. In some examples, spacecraft 1501 may be integrated into a multi-agent space based solar power array. The multi-agent spaced based solar power array may convert absorbed electromagnetic radiation into electricity and transmit the electricity as a laser beam to a terrestrial based receiver. The terrestrial based receiver absorbs the laser beam(s) and converts the absorbed energy into electricity for use in terrestrial applications. For example, the terrestrial based receiver may be located on the lunar surface and provide electricity to a lunar habitat.

Figure 17:
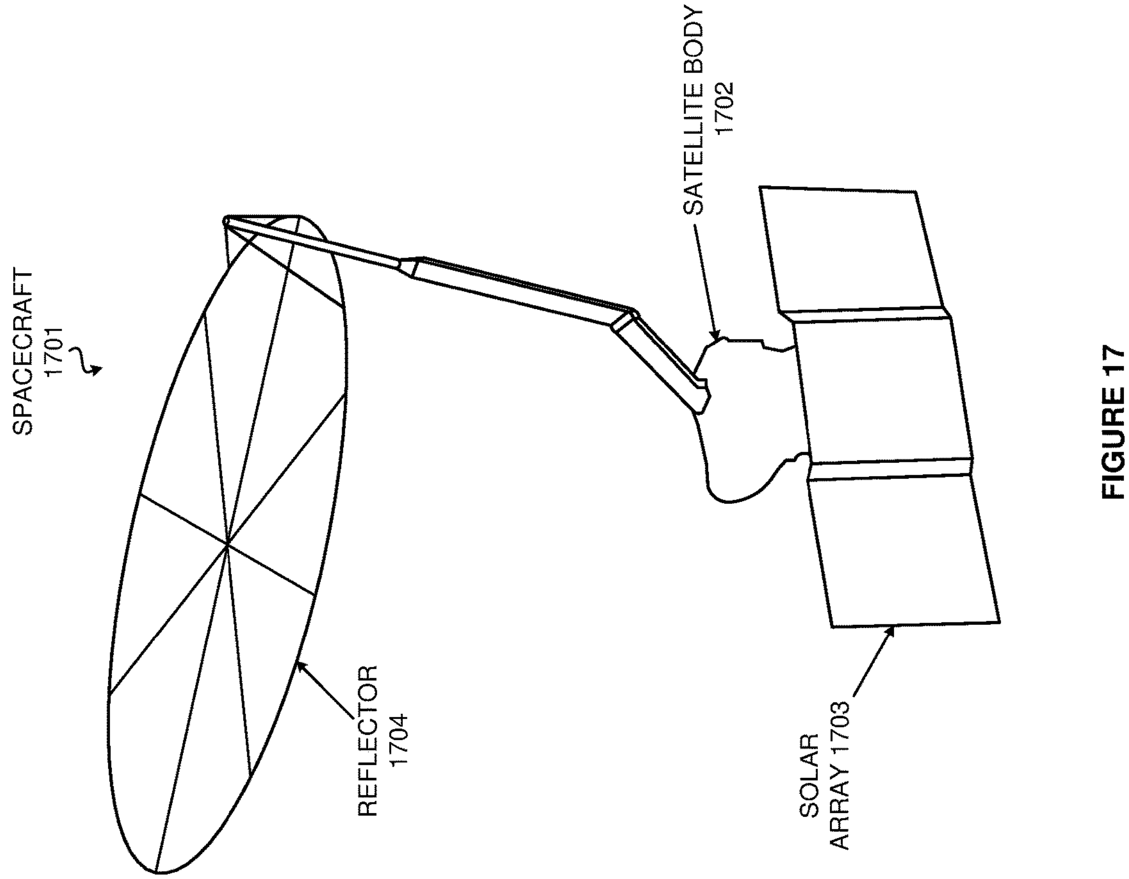
FIG. 17 illustrates an exemplary spacecraft.

FIG. 17 illustrates view 1700. View 1700 illustrates spacecraft 1701 according to various embodiments of the present technology. Spacecraft 1701 comprises spacecraft body 1702, solar array 1703, and reflector 1704. Reflector 1704 comprises a parabolic dish that is cantilevered to facilitate a certain range of focus area. Solar power array 1703 absorbs electromagnetic radiation to power the subcomponents of the spacecraft. Spacecraft 1701 may be integrated into a multi-agent satellite group and arranged to reflect electromagnetic radiation (e.g., sunlight) to a focal point (e.g., lunar regolith).

Figure 18:
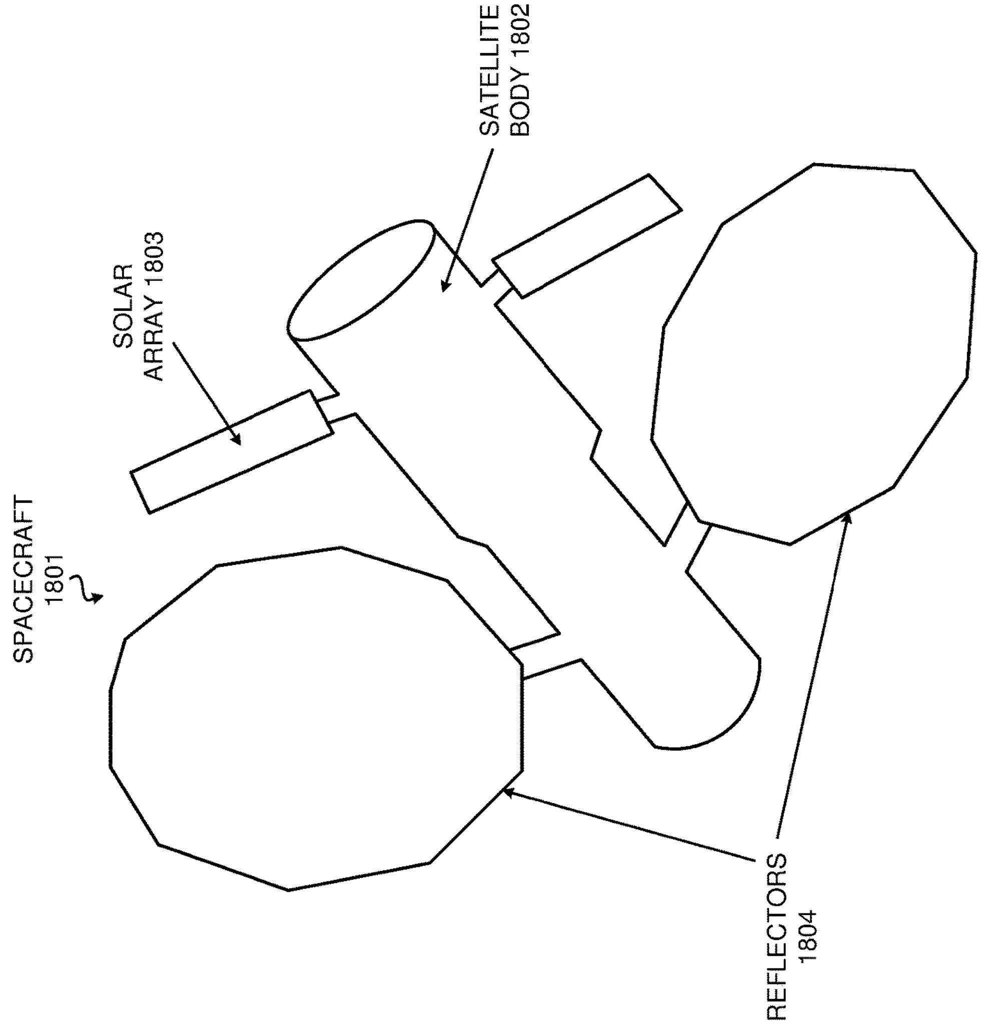
FIG. 18 illustrates an exemplary spacecraft.

FIG. 18 illustrates view 1800. View 1800 illustrates spacecraft 1801 according to various embodiments of the present technology. Spacecraft 1801 comprises spacecraft body 1802, solar array 1803, and reflectors 1804. Spacecraft 1801 comprises multiple reflectors to focus rays on an object. Reflectors 1804 each comprise a parabolic dish. Spacecraft 1801 may be integrated into a multi-agent satellite group and arranged to reflect electromagnetic radiation (e.g., sunlight) to a focal point (e.g., adversary satellite location). In some examples, reflectors 1804 may be utilized in a multi-mirror photovoltaic system. For example, reflectors 1804 may comprise primary reflectors spaced apart by a distance (e.g., up to five kilometers). Reflectors 1804 comprise a shared focus point that targets secondary mirrors. Reflectors 1804 reflect electromagnetic energy to the secondary mirrors which in turn reflect the focus energy to a spacecraft mounted photovoltaic system. The photovoltaic system then generates and transfers the resulting electrical energy as a microwave ray or laser beam for reception by a receiving station. Reflectors 1804 may comprise foldable reflectors that are collapsible into an origami arrangement. For example, reflectors 1804 may be initially folded when spacecraft 1801 is launched and unfold from their origami arrangement when spacecraft 1801 is deployed.

Figure 19:
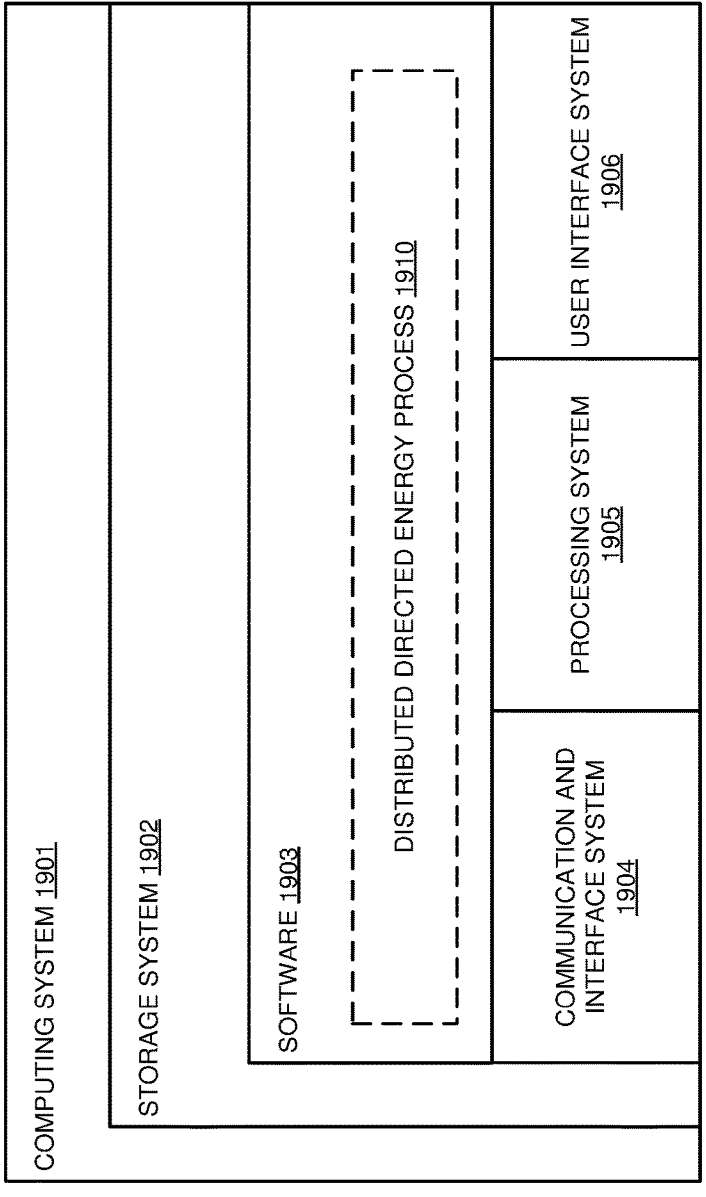
FIG. 19 illustrates an exemplary computing system.

FIG. 19 illustrates computing environment 1900. Computing environment 1900 comprises computing system 1901. Computing system 1901 is representative of any system or collection of systems with which the various operational architectures, processes, scenarios, and sequences disclosed herein for controlling and operating distributed directed energy arrays. For example, computing system 1301 may be representative of spacecrafts 110, terrestrial systems 401, satellites 411, space subsystems 1210, spacecraft 1501, spacecraft 1701, spacecraft 1801, and/or any other computing device contemplated herein. Computing system 1901 may be implemented as a single apparatus, system, or device or may be implemented in a distributed manner as multiple apparatuses, systems, or devices. Computing system 1901 includes, but is not limited to, storage system 1902, software 1903, communication interface system 1904, processing system 1905, and user interface system 1906. Processing system 1905 is operatively coupled with storage system 1902, communication interface system 1904, and user interface system 1906.

Processing system 1905 loads and executes software 1903 from storage system 1902. Software 1903 includes and implements distributed directed energy process 1910, which is representative of any of the distributed directed energy processes described with respect to the preceding Figures, including but not limited to the target detection, spacecraft maneuver, and spacecraft control operations described with respect to the preceding Figures. For example, distributed directed energy process 1510 may be representative of process 300 illustrated in FIG. 3, process 600 illustrated in FIG. 6, and/or process 700 illustrated in FIG. 7. When executed by processing system 1905 to implement a distributed directed energy process, software 1903 directs processing system 1905 to operate as described herein for at least the various processes, operational scenarios, and sequences discussed in the foregoing implementations. Computing system 1901 may optionally include additional devices, features, or functionality not discussed for purposes of brevity.

Processing system 1905 may comprise a micro-processor and other circuitry that retrieves and executes software 1903 from storage system 1902. Processing system 1905 may be implemented within a single processing device but may also be distributed across multiple processing devices or subsystems that cooperate in executing program instructions. Examples of processing system 1905 include general purpose CPUs, GPUs, DSPs, ASICs, FPGAs, analog computing devices, and logic devices, as well as any other type of processing device, combinations, or variations thereof.

Storage system 1902 may comprise any computer readable storage media readable by processing system 1905 and capable of storing software 1903. Storage system 1902 may include volatile, nonvolatile, removable, and/or non-removable media implemented in any method or technology for storage of information, such as computer readable instructions, data structures, program modules, or other data. Examples of storage media include RAM, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1902 may also include computer readable communication media over which at least some of software 1903 may be communicated internally or externally. Storage system 1902 may be implemented as a single storage device but may also be implemented across multiple storage devices or sub-systems co-located or distributed relative to each other. Storage system 1902 may comprise additional elements, such as a controller, capable of communicating with processing system 1905 or possibly other systems.

Software 1903 (including distributed directed energy process 1910) may be implemented in program instructions and among other functions may, when executed by processing system 1905, direct processing system 1905 to operate as described with respect to the various operational scenarios, sequences, and processes illustrated herein. For example, software 1903 may include program instructions for determining the orbit of a debris object, determining maneuvers to co-locate a sharded focal point of a multi-agent spacecraft group with the debris object, and executing the determined maneuvers as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1903 may include additional processes, programs, or components, such as operating system software, virtualization software, or other application software. Software 1903 may also comprise firmware or some other form of machine-readable processing instructions executable by processing system 1905.

In general, software 1903 may, when loaded into processing system 1905 and executed, transform a suitable apparatus, system, or device (of which computing system 1901 is representative) overall from a general-purpose computing system into a special-purpose computing system customized to implement a distributed directed energy process as described herein. Indeed, encoding software 1903 on storage system 1902 may transform the physical structure of storage system 1902. The specific transformation of the physical structure may depend on various factors in different implementations of this description. Examples of such factors may include, but are not limited to, the technology used to implement the storage media of storage system 1902 and whether the computer-storage media are characterized as primary or secondary storage, as well as other factors.

For example, if the computer readable storage media are implemented as semiconductor-based memory, software 1903 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1904 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, lasers, and other communication circuitry. The connections and devices may communicate over communication media to exchange communications with other computing systems or networks of systems, such as metal, glass, air, vacuum, or any other suitable communication media. The aforementioned media, connections, and devices are well known and need not be discussed at length here.

Communication between computing system 1901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and an extended discussion of them is omitted for the sake of brevity.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A distributed directed energy system, the system comprising:

a multi-agent spacecraft group that comprises two or more spacecraft that each comprise at least one reflector and at least one detection system;

the multi-agent spacecraft group configured to:

sense a target;

generate telemetry data describing a spatial location of the target based on the sensing;

determine the spatial location of the target based on the telemetry data;

generate a maneuver command for the multi-agent spacecraft group to position a shared focal point of the multi-agent spacecraft group at the spatial location of the target;

execute the maneuver command to position the shared focal point of the multi-agent spacecraft group at the spatial location of the target; and reflect electromagnetic energy to the shared focal point of the multi-agent spacecraft group to irradiate the target.

2. The distributed directed energy system of claim 1 wherein the multi-agent spacecraft group is configured to:

generate a digital twin of the target based on telemetry data that depicts a trajectory of the target; and generate the maneuver command based on the digital twin.

3. The distributed directed energy system of claim 1 further comprising a terrestrial system communicatively coupled to the multi-agent spacecraft group; and wherein:

the multi-agent spacecraft group is configured to:

wirelessly transfer a notification to the terrestrial system indicating the target; and the terrestrial system is configured to:

wirelessly receive the notification from the multi-agent spacecraft group; and wirelessly transfer an irradiation command to the multi-agent spacecraft group to irradiate the target; and the multi-agent spacecraft group is configured to:

wirelessly receive the irradiation command from the terrestrial system; and generate the maneuver command for the multi-agent spacecraft group to position the shared focal point of the multi-agent spacecraft group at the spatial location of the target in response to the irradiation command.

4. The distributed directed energy system of claim 1 wherein the target comprises at least one of a debris object, a material extraction location, a material processing system, an energy generation system, a heating system, an illumination target, a weapon system, another spacecraft, or an asteroid.

5. The distributed directed energy system of claim 1 wherein the electromagnetic energy comprises one or more of naturally occurring electromagnetic energy or manmade electromagnetic energy.

6. The distributed directed energy system of claim 1 further comprising a terrestrial system communicatively coupled to the multi-agent spacecraft group; and wherein:

the terrestrial system is configured to wirelessly transfer a communication to the multi-agent spacecraft group; and the multi-agent spacecraft group is configured to reflect the communication towards a communication receiver; and the communication receiver comprises at least one of another terrestrial system or another spacecraft.

7. The distributed directed energy system of claim 1 further comprising a neural network hosted by the multi-agent spacecraft group and trained to detect a target and plan a trajectory of the multi-agent spacecraft group.

8. The distributed directed energy system of claim 1 further comprising:

one or more ground based systems configured to reflect the electromagnetic energy to the shared focal point; and wherein:

the two or more spacecraft and the one or more ground based systems each comprise the at least one reflector.

9. The distributed directed energy system of claim 1 wherein the multi-agent spacecraft group is configured to determine an orbit of the target based on the telemetry data to determine the spatial location of the target.

10. A method of operating a distributed directed energy system, the method comprising:

identifying a target;

sensing the target;

generating telemetry data describing a spatial location of the target based on the sensing;

determining the spatial location of the target based on the telemetry data;

generating a maneuver command for a multi-agent spacecraft group to position a shared focal point of the multi-agent spacecraft group at the spatial location of the target, wherein the multi-agent spacecraft group comprises two or more spacecraft that each comprise at least one reflector;

executing the maneuver command and maneuvering the multi-agent spacecraft group to position the shared focal point of the multi-agent spacecraft group at the spatial location of the target; and reflecting electromagnetic energy to the shared focal point of the multi-agent spacecraft group to irradiate the target.

11. The method of claim 10 further comprising:

generating a digital twin of the target based on telemetry data that depicts a trajectory of the target; and wherein:

generating the maneuver command comprises generating the maneuver command based on the digital twin.

12. The method of claim 10 further comprising:

wirelessly transferring a notification to a terrestrial system indicating the target; and wirelessly receiving the irradiation command from the terrestrial system; and wherein:

generating the maneuver command for the multi-agent spacecraft group comprises generating the maneuver command for the multi-agent spacecraft group to position the shared focal point of the multi-agent spacecraft group at the spatial location of the target in response to the irradiation command.

13. The method of claim 10 wherein the target comprises at least one of a debris object, a material extraction location, a material processing system, an energy generation system, a heating system, a weapon system, an illumination target, another spacecraft, or an asteroid.

14. The method of claim 10 wherein the electromagnetic energy comprises one or more of naturally occurring electromagnetic energy or manmade electromagnetic energy.

15. The method of claim 10 further comprising:

wirelessly receiving a communication transmitted by a terrestrial system;

reflecting the communication towards a communication receiver; and wherein:

the communication receiver comprises at least one of another terrestrial system or a spacecraft.

16. The method of claim 10 further comprising hosting a neural network trained to locate the target and plan a trajectory of the multi-agent spacecraft group.

17. The method of claim 10 wherein:

the multi-agent spacecraft group comprises two or more spacecraft and one or more ground based systems comprising the reflectors; and maneuvering the multi-agent spacecraft group comprises maneuvering the two or more spacecraft and the one or more ground based systems to co-locate the shared focal point of the reflectors with the spatial location of the target.

18. The method of claim 10 wherein determining the spatial location of the target based on the telemetry data comprises determining an orbit of the target based on the telemetry data.

19. One or more non-transitory computer-readable storage media having program instructions stored thereon to operate a distributed directed energy system that comprises a spacecraft that comprises a reflector, wherein the program instructions, when executed by a computing system, direct the computing system to perform operations, the operations comprising:

directing a sensor suite to sense a target;

generating telemetry data describing a trajectory of the target based on the sensing;

driving transceiver circuitry to wirelessly transfer a notification indicating the target to a terrestrial system;

receiving, via the transceiver circuitry, an irradiation command from the terrestrial system;

in response to the irradiation command, generating a maneuver command to maneuver the spacecraft to co-locate a focal point of the reflector with the target, wherein the spacecraft is a part of a multi-agent spacecraft group comprising two or more spacecraft; and directing a propulsion system to execute the maneuver command, wherein the reflector reflects electromagnetic energy to irradiate the target.

20. The non-transitory computer-readable storage media of claim 19, the operations further comprising:

generating a digital twin of the target based on telemetry data that depicts a trajectory of the target; and wherein:

generating the maneuver command comprises generating the maneuver command based on the digital twin.

* * * * *